United States Patent
Liang et al.

(10) Patent No.: US 9,825,748 B2
(45) Date of Patent: Nov. 21, 2017

(54) OFFLOADING AND RESELECTION POLICIES AND RULES FOR MOBILE DEVICES

(71) Applicant: Apple Inc., Cupertino, CA (US)

(72) Inventors: Huarui Liang, Beijing (CN); Tarik Tabet, San Jose, CA (US); Farouk Belghoul, Campbell, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 169 days.

(21) Appl. No.: 14/502,391

(22) Filed: Sep. 30, 2014

(65) Prior Publication Data

US 2015/0223115 A1 Aug. 6, 2015

Related U.S. Application Data

(60) Provisional application No. 61/935,302, filed on Feb. 3, 2014.

(51) Int. Cl.
*H04L 5/00* (2006.01)
*H04L 27/00* (2006.01)
(Continued)

(52) U.S. Cl.
CPC .......... *H04L 5/0073* (2013.01); *H04B 1/715* (2013.01); *H04L 5/001* (2013.01); *H04L 5/0012* (2013.01);
(Continued)

(58) Field of Classification Search
None
See application file for complete search history.

(56) References Cited

U.S. PATENT DOCUMENTS 7,583,653 B2 9/2009 Adjakple et al.
8,837,422 B2 9/2014 Chen et al.
(Continued)

FOREIGN PATENT DOCUMENTS

GB 2398749 A 9/2004
WO WO2009117701 A2 9/2009
(Continued)

OTHER PUBLICATIONS

Cisco, "On LTE in Unlicensed Spectrum", 3GPP TSG-RAN Meeting #62 RP-131749, 3GPP, Dec. 3, 2013.
(Continued)

*Primary Examiner* — Jeffrey M Rutkowski
*Assistant Examiner* — Ning Li
(74) *Attorney, Agent, or Firm* — Downey Brand LLP

(57) ABSTRACT

Apparatus and methods for managing use of radio frequency channels in unlicensed radio frequency bands by a wireless communication device in communication with a cellular wireless network are disclosed. The wireless communication device obtains, from an eNodeB of the wireless network, one or more access network discovery and selection function (ANDSF) policies that include rules for mobility of the wireless communication device and offloading of traffic for the wireless communication device to radio frequency channels in an unlicensed radio frequency band. The wireless communication device determines when at least one radio frequency channel in the unlicensed radio frequency band is available for offloading traffic, for network selection, for network re-selection, or for a supplemental connection via carrier aggregation based on the ANDSF policies, measured interference levels, and/or loading information provided by the eNodeB.

20 Claims, 15 Drawing Sheets

(51) Int. Cl.
  *H04W 28/08* (2009.01)
  *H04W 72/04* (2009.01)
  *H04B 1/715* (2011.01)
  *H04W 16/14* (2009.01)
  *H04W 84/12* (2009.01)

(52) U.S. Cl.
  CPC ....... *H04L 27/0006* (2013.01); *H04W 28/085* (2013.01); *H04W 72/0453* (2013.01); *H04B 2001/7154* (2013.01); *H04W 16/14* (2013.01); *H04W 84/12* (2013.01)

(56) References Cited

U.S. PATENT DOCUMENTS

| | | | |
|---|---|---|---|
| 8,923,323 B2 | 12/2014 | Heo et al. | |
| 9,042,315 B2 | 5/2015 | Lin et al. | |
| 9,537,642 B2 | 1/2017 | Belghoul et al. | |
| 2008/0232345 A1 | 9/2008 | Espina et al. | |
| 2008/0299987 A1 | 12/2008 | Iyer et al. | |
| 2010/0173667 A1 | 7/2010 | Hui et al. | |
| 2010/0195584 A1 | 8/2010 | Wilhelmsson et al. | |
| 2011/0287794 A1* | 11/2011 | Koskela | H04W 28/08 455/509 |
| 2011/0319065 A1 | 12/2011 | Dalsgaard et al. | |
| 2012/0082140 A1 | 4/2012 | Lin et al. | |
| 2012/0207033 A1* | 8/2012 | Hakola | H04W 16/14 370/252 |
| 2013/0121315 A1 | 5/2013 | Langereis et al. | |
| 2013/0150036 A1 | 6/2013 | Pattaswamy et al. | |
| 2014/0029420 A1 | 1/2014 | Jeong et al. | |
| 2014/0044105 A1 | 2/2014 | Bontu et al. | |
| 2015/0126207 A1* | 5/2015 | Li | H04W 72/082 455/452.1 |
| 2015/0148038 A1 | 5/2015 | Griot et al. | |
| 2015/0201431 A1 | 7/2015 | Um et al. | |
| 2015/0222410 A1 | 8/2015 | Belghoul et al. | |
| 2015/0223243 A1 | 8/2015 | Tabet et al. | |
| 2015/0256305 A1 | 9/2015 | Yerramalli et al. | |
| 2015/0282058 A1* | 10/2015 | Forssell | H04W 48/18 455/552.1 |
| 2015/0373729 A1* | 12/2015 | Lee | H04W 8/245 370/329 |
| 2015/0382281 A1* | 12/2015 | Sirotkin | H04W 52/0251 455/552.1 |
| 2016/0050709 A1* | 2/2016 | Bergstrom | H04W 88/06 455/450 |
| 2016/0112164 A1 | 4/2016 | Worrall | |
| 2016/0174233 A1 | 6/2016 | Emmanuel et al. | |
| 2016/0205696 A1 | 7/2016 | Chen et al. | |
| 2016/0227467 A1* | 8/2016 | Tomici | H04W 48/16 |
| 2016/0277172 A1 | 9/2016 | Yu et al. | |
| 2016/0301504 A1* | 10/2016 | Toskala | H04W 48/16 |

FOREIGN PATENT DOCUMENTS

| | | |
|---|---|---|
| WO | WO2012116273 A1 | 8/2012 |
| WO | 2012171931 A1 | 12/2012 |
| WO | 2013179095 A1 | 12/2013 |

OTHER PUBLICATIONS

"Network Based IP flow mobility", Release 12, 3GPP TR 23.861 V1 . 7.0, 3GPP, Nov. 2012.

Japanese Patent Application No. 2015-018776—First Office Action dated Jan. 29, 2016.

German Patent Application No. 10 2015 201 432.0—Office Action dated Mar. 13, 2017.

\* cited by examiner

OFFLOADING AND RESELECTION POLICIES AND RULES FOR MOBILE DEVICES

CROSS REFERENCE TO RELATED APPLICATIONS

This application claims the benefit of U.S. Provisional Application No. 61/935,302, filed Feb. 3, 2014 and entitled "METHODS AND APPARATUSES FOR COMMUNICATION IN UNLICENSED FREQUENCY BANDS BY MOBILE DEVICES", which is incorporated by reference herein in its entirety for all purposes.

This application is related to U.S. patent application Ser. No. 14/502,410, entitled "METHOD AND APPARATUS FOR TIME DIVISION COEXISTENCE IN UNLICENSED RADIO FREQUENCY BANDS FOR MOBILE DEVICES" and U.S. patent application Ser. No. 14/502,420, entitled "METHOD AND APPARATUS FOR FREQUENCY HOPPING COEXISTENCE IN UNLICENSED RADIO FREQUENCY BANDS FOR MOBILE DEVICES", both of which are filed concurrently herewith and which are incorporated by reference herein in their entirety for all purposes.

FIELD

The described embodiments generally relate to wireless communications, and more particularly, to methods and apparatuses for offloading and reselection policies and rules for mobile wireless devices operating in licensed and unlicensed radio frequency bands.

BACKGROUND

Fourth generation (4G) cellular networks employing newer radio access technology systems that implement the $3^{rd}$ Generation Partnership Project (3GPP) Long Term Evolution (LTE) and LTE Advanced (LTE-A) standards are rapidly being developed and deployed within the United States and abroad. The LTE-A standard includes modes for aggregation of multiple component carriers (CCs) to provide for meeting the bandwidth requirements of multi-carrier systems that cumulatively achieve data rates not possible by predecessor LTE versions. Wireless communication devices can include configurable radio frequency (RF) circuitry that can transmit and/or receive radio frequency communications using multiple component carriers in a single radio frequency band and/or in multiple radio frequency bands. With wireless networks encountering exponential growth of Internet traffic, such as video traffic, web browsing traffic, and other data traffic that can be carried over the Internet, development of new wireless communication protocols that can support wider bandwidths, a greater range of radio frequencies, and higher throughput data rates arises. Given the costs and/or data traffic limits to communicate over cellular wireless networks, users can prefer to communicate over "free" wireless local area networks (WLANs), subscription based WLANs, and/or operator provided WLANs when possible. In unlicensed radio frequency bands, in which WLANs typically operate, cellular wireless communication devices do not presently operate, but standardization efforts and exploration have begun that seek to add bandwidth for cellular transmissions by using radio frequency channels within the unlicensed radio frequency bands presently occupied by WLANs. In particular, the 5 GHz radio frequency band is targeted to provide for secondary carrier LTE transmission in a carrier aggregation mode.

As such, there exists a need for solutions that provide methods and apparatuses for offloading and reselection policies and rules for mobile wireless devices operating in licensed radio frequency bands, unlicensed radio frequency bands, and in combinations of both licensed and unlicensed radio frequency bands. In this regard, it would be beneficial to manage the use of secondary component carriers by a wireless communication device employing carrier aggregation to include capabilities for communication in unlicensed radio frequency bands in addition to licensed radio frequency bands.

SUMMARY

Apparatus and methods for offloading and reselection policies and rules for mobile wireless devices operating in licensed radio frequency bands, unlicensed radio frequency bands, and in combinations of both licensed and unlicensed radio frequency bands are described. Wireless cellular network equipment, e.g., base stations (also referred to as enhanced NodeB's or eNodeB's) alone or in combination with additional wireless network equipment, can manage the use of secondary component carriers associated with secondary cells by one or more wireless communication devices that employ carrier aggregation to transmit and/or receive using multiple radio frequency carriers in parallel. The secondary component carriers can be centered at radio frequencies in an unlicensed radio frequency band, e.g., the 5 GHz Industrial, Medical, and Scientific (ISM) band, while a primary component carrier for a primary cell can operate in a licensed cellular radio frequency band. The network equipment schedules data communication between a cellular wireless network and a wireless communication device using the primary component carrier, e.g., as specified in LTE/LTE-A wireless communication protocols, and supplements the data communication with additional bandwidth in the unlicensed radio frequency band over a secondary component carrier. A wireless communication device able to communicate using carrier aggregation with component carriers in a combination of licensed and unlicensed radio frequency bands can be referred to herein as an LTE-Unlicensed (LTE-U) capable wireless communication device. The primary and secondary component carriers belong to primary and secondary cells respectively and are managed through a common eNodeB (base station). The unlicensed radio frequency band is shared with other wireless devices that operate in the same unlicensed radio frequency band, e.g., wireless local area network (WLAN) devices that use a Wi-Fi wireless communication protocol. In some embodiments, a wireless network operator can deploy a "small" cell that operates in the unlicensed radio frequency band over a limited geographic coverage area, e.g., significantly smaller than covered by a macro-cell of a cellular wireless network. In some embodiments, the wireless cellular operator can deploy and manage a combination of network equipment using both 3GPP LTE/LTE-A wireless cellular communication protocols, including extensions for operation using unlicensed radio frequency bands, as well as WLAN (Wi-Fi) communication protocols in parallel, e.g., both cell towers and Wi-Fi hotspots can be deployed and managed by the wireless network operator. In some embodiments, the wireless network operator uses Wi-Fi networks to provide for offloading data traffic from cellular access networks. As described herein, a set of access network discovery and selection function (ANDSF) policies and rules can include objects to provide for managing communication via multiple wireless access networks in parallel that use different wireless communication protocols and/or radio frequency bands. In some embodiments, the ANDSF policies and rules provide for carrier aggregation, offloading, network selection, network reselection, and other network management capabilities so that LTE-U capable wireless communication devices can use a combination of cellular wireless networks that operate in both licensed radio frequency bands and unlicensed radio frequency bands and wireless local area networks that operate in unlicensed radio frequency bands. In some embodiments, the ANDSF policies and rules further provide for wireless communication using carrier aggregation across a combination of licensed and unlicensed radio frequency bands in parallel by a wireless communication device.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art at the time of this disclosure.

DETAILED DESCRIPTION

Figure 1:
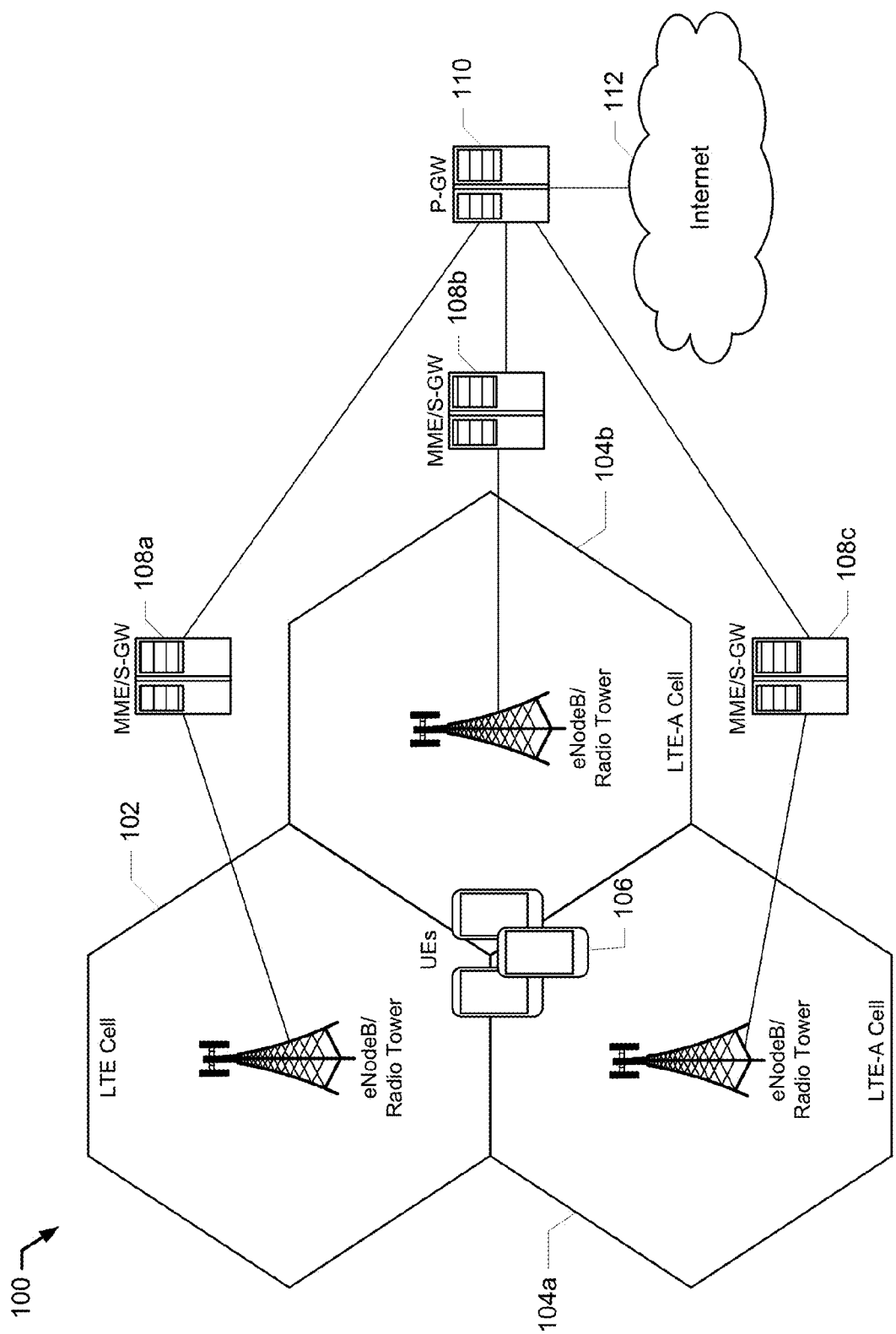
FIG. 1 illustrates a wireless communication network including Long Term Evolution (LTE) and LTE Advanced (LTE-A) network cells supporting multiple user equipment devices (UEs), in accordance with various embodiments of the disclosure.

Representative applications of systems, methods, apparatuses, and computer program products according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

In various embodiments, these capabilities may allow a respective UE to communicate within various 4G network cells that can employ any type of LTE-based radio access technology (RAT) supporting carrier aggregation. In some embodiments, the respective UE may communicate using an LTE-based RAT and/or in accordance with a wireless communication protocol for a wireless local area network (WLAN). In some embodiments, the UE may operate using LTE wireless communication protocols in licensed radio frequency bands and/or in a combination of licensed and unlicensed radio frequency bands. In some embodiments, the UE may offload all or a portion of data communication between a cellular connection of an LTE-based wireless network and a connection via a WLAN. In some embodiments, the UE may offload portions of data between component carriers of a carrier aggregation scheme. In some embodiments, the component carriers can be in a combination of licensed and unlicensed radio frequency bands. In some embodiments, a wireless network provider can manage offloading of data communication between networks using different RATs, including some that operate in accordance with different wireless communication protocols. In some embodiments, the UE can transfer a connection, e.g., via reselection, between an LTE-based wireless network and a WLAN.

In some embodiments, the UE can communicate using multiple component carriers in accordance with carrier aggregation as specified by an LTE-A wireless communication protocol. Wireless communication devices that communicate in accordance with 3GPP LTE and/or LTE-A wireless communication protocols can use carrier aggregation to provide for increased throughput, e.g., in a downlink direction from multiple cells of a wireless network. A primary component carrier, which can be associated with a first cell (primary cell) of the wireless network, can be used for a combination of downlink communication from the wireless network to the wireless communication device and uplink communication from the wireless communication device to the wireless network. A secondary component carrier, which can be associated with a second cell (secondary cell) of the wireless network, can be used for downlink communication. The aggregate data rate achievable through carrier aggregation with multiple component carriers can surpass data rates achievable by using only a single component carrier. Uplink communication, however, in some embodiments, can be constrained to use only the primary component carrier.

Extensions to LTE/LTE-A wireless communication protocols can provide for using combinations of a primary component carrier in a licensed radio frequency band and one or more secondary component carriers in unlicensed radio frequency bands, as described further herein.

Each component carrier used in carrier aggregation can be centered at different radio frequency values within a common radio frequency band or across two separate radio frequency bands. The separate radio frequency bands can include licensed radio frequency bands or a combination of both licensed and unlicensed radio frequency bands. In some embodiments, communication via a primary component carrier used for carrier aggregation can be within a licensed radio frequency band and communication via a secondary component carrier used for carrier aggregation by the UE can be within an unlicensed radio frequency band. A wireless network provider, via wireless network equipment, can manage the use of secondary component carriers for carrier aggregation in unlicensed radio frequency bands in a manner to mitigate coexistence interference with other wireless communication devices sharing the unlicensed radio frequency bands. The wireless network provider can use one or more performance metrics collected by UEs and/or by access network equipment, e.g., eNodeBs, which monitor radio frequency conditions, signal quality, data communication performance, link stability, or the like, to determine whether, when, and/or how to offload data communication between parallel wireless networks, to share data communication using multiple component carriers via carrier aggregation, and/or to reselect between different wireless networks that use different RATs, including WLANs.

Additionally, it should be understood that the UEs described herein may be configured as multi-mode wireless communication devices that are also capable of communicating via additional third generation (3G) and/or second generation (2G) RATs. In these scenarios, a multi-mode UE can be configured to "prefer" attachment to LTE or LTE-A networks offering faster data rate throughput, as compared to legacy 3G networks offering lower data rate throughputs. For instance, in some implementations, a 4G compliant UE may be configured to fall back to a legacy 3G network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1 depicts a wireless communication system 100, which can comply with a 3GPP Evolved Universal Terrestrial Radio Access (E-UTRA) air interface, and can include, but is not limited to including, an LTE network cell 102 and two LTE-A network cells 104a-b, respectively having enhanced NodeB (eNodeB) base stations (e.g., depicted as radio towers) that can communicate between and amongst each other via an LTE-X2 interface. Further, the E-UTRA compliant communication system 100 can include any number of mobility management entities (MMEs) 108a-c, serving gateways (S-GWs) 108a-c, PDN gateways (P-GWs) 110, etc., which, as part of an evolved packet core (EPC), can communicate with any of the LTE and LTE-A cell eNodeBs, 102 and 104a-b, via an LTE-S1 interface. Additionally, the E-UTRA communication system 100 can include any number of UEs 106 that can receive wireless communications service via one or more of the eNodeBs of the LTE and LTE-A cells, 102 and 104a-b, at any particular time. By way of example, a UE 106 may be located within one or more LTE-A cell(s) 104a-b. While not explicitly illustrated in FIG. 1, LTE and LTE-A cells can overlap at least partially in geographic area covered by each cell.

In various embodiments, any of the MMEs 108a-c and/or any of the eNodeB base stations of the LTE-A cells 104a-b, which are capable of supporting carrier aggregation, can be configured to communicate control-plane data to any of the UEs 106 in the DL; Alternatively, any of the UEs 106 may be capable of communicating control-plane data via any of the LTE-A cells 104a-b in the UL. In this regard, it should be understood that the MMEs 108a-b can perform Non-Access Stratum (NAS) control-plane signaling between the EPC and the UE 106 via the eNodeB over the radio access network (RAN) portion of the network. In some scenarios, NAS signaling can include, but is not limited to including, procedures for establishing and releasing radio bearer connections for user equipment (UE), affecting UE transitions from idle mode to connected mode (and vice versa) by generating corresponding paging messages, and implementing various communication security features.

Further, the eNodeB base stations of the LTE-A cells 104a-b can be configured to perform various radio resource control (RRC) control-plane signaling procedures, including, but not limited to including, system information broadcasting, transmitting paging messages emanating from MMEs, RRC parameter configuration for UEs, network cell selection and reselection procedures, measurement and reporting configuration for UEs, monitoring and reporting of radio link signal quality, and management of radio connections between various UE and a wireless network including adding, deleting, and transitioning between the use of different radio bearers, including component carriers used for carrier aggregation, etc. In various implementations, RRC control plane signaling may be performed in conjunction with one or more of the following LTE protocol entities or layers: the packet data convergence protocol (PDCP), the radio link control (RLC) layer, the medium access control (MAC) layer, and the physical (PHY) layer. It should be understood that control-plane data and user-plane data can be multiplexed within the MAC layer and communicated to an intended recipient via the PHY layer, in the downlink (DL) or in the uplink (UL), e.g., during the same transmission time interval (TTI).

Figure 2A:
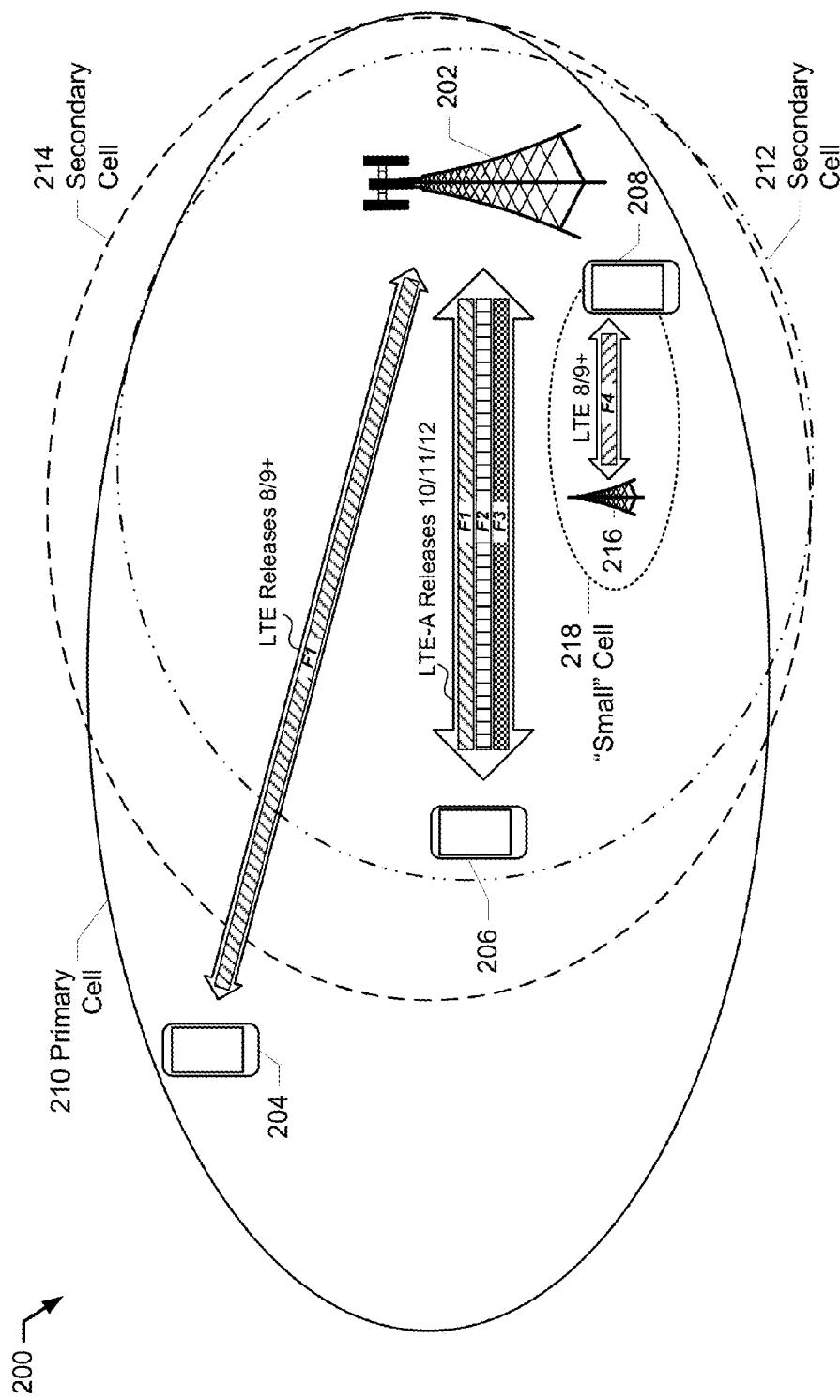
FIGS. 2A and 2B illustrate a wireless communication network diagram depicting LTE and LTE-A user equipment (UE) in communication with a primary carrier cell and with one or more secondary carrier cells, in accordance with various implementations of the disclosure.

FIG. 2A illustrates a wireless communication network diagram 200 depicting an LTE-A compliant UE 206 that is in communication with a primary cell 210 and with two secondary cells 212 and 214, each cell overlapping but not necessarily covering the same geographic area, in a carrier aggregation scenario. By way of example, and with reference to 3GPP LTE-A Releases 10, 11, and 12, the LTE-A compliant UE 206 can communicate with the eNodeB base station 202 (e.g., in the DL or the UL), which can have radio frequency transmission and reception equipment for providing radio coverage via three distinct radio frequency resources (also referred to as carriers), F1, F2, and F3. The three carriers can be used as individual component carriers (CCs) for communication that can be provided to UE 206 in aggregate, e.g., to offer higher communication bandwidth and/or throughput than can be possible using only a single component carrier. From the perspective of the LTE-A compliant UE 206, the CC radio frequency resource F1 can be associated with the primary cell 210, the CC radio frequency resource F2 can be associated with the secondary cell 212, and the CC radio frequency resource F3 can be associated with the secondary cell 214. Alternative carrier aggregation representations for a frequency resource scenario are described further herein for FIGS. 3A, 3B and 3C.

The communication network diagram 200 also depicts an LTE compliant UE 204, with reference to 3GPP LTE Releases 8 and 9, which is not capable of communicating using carrier aggregation with multiple component carriers but can communicate in accordance with an LTE wireless communication protocol using one component carrier, e.g., the primary component carrier. By way of example, the LTE compliant UE 204 can communicate with the eNodeB base station 202 (in the DL or the UL) via a single frequency resource F1. In the single carrier scenario, the LTE compliant UE 204 employs individual standard-designated system bandwidths that limit achievable data rate throughput to roughly 300 Mbits/sec. in the DL, and roughly 75 Mbits/sec. in the UL (real world implementations may vary) using a frequency bandwidth that can range from 1.4 MHz up to 20 MHz. The communication network diagram 200 also depicts an LTE compliant UE 208, which operates in accordance with an LTE wireless communication protocol (e.g., 3GPP LTE Releases 8/9 or later) and can connect to a wireless network via a single frequency resource F4, which can be associated with a "small" cell 218, i.e., a cell having a geographic coverage range that is less than that of a usual "macro" cell for a wireless network. In some embodiments, the "small" cell 218 can be also referred to as a micro-cell, nano-cell, or femto-cell, which can provide limited coverage that supplements coverage provided by a macro cell, e.g., by the primary cell 210, of a cellular wireless network. The "small" cell 218 can emanate from dedicated network equipment 216, which can be connected to the wireless network via a "back haul" using either a wired or wireless connection. In some embodiments, the "small" cell 218 connects to the wireless network via a wired connection (e.g., through a "broadband" link). A wireless network provider can offer services for a "home" based "small cell" that provides short range coverage within a limited area to supplement service provided by one or more macro cells of the cellular wireless network. Wireless network providers can seek to use multiple parallel connection options in order to balance network loading and provide for greater coverage, higher data rates, and/or greater link stability using a combination of "macro" cells and "small" cells. In some embodiments, a wireless network provider can operate the "small" cell 218 using a carrier in a licensed radio frequency band, e.g., via frequency resource F4. In some embodiments, the wireless network provider can operate the "small" cell 218 using a secondary component carrier in an unlicensed radio frequency band to supplement communication via a primary component carrier in a licensed radio frequency band. An LTE-U capable wireless communication device would be able to connect to the wireless network using a combination of component carriers in both licensed and unlicensed radio frequency bands via carrier aggregation.

Figure 2B:
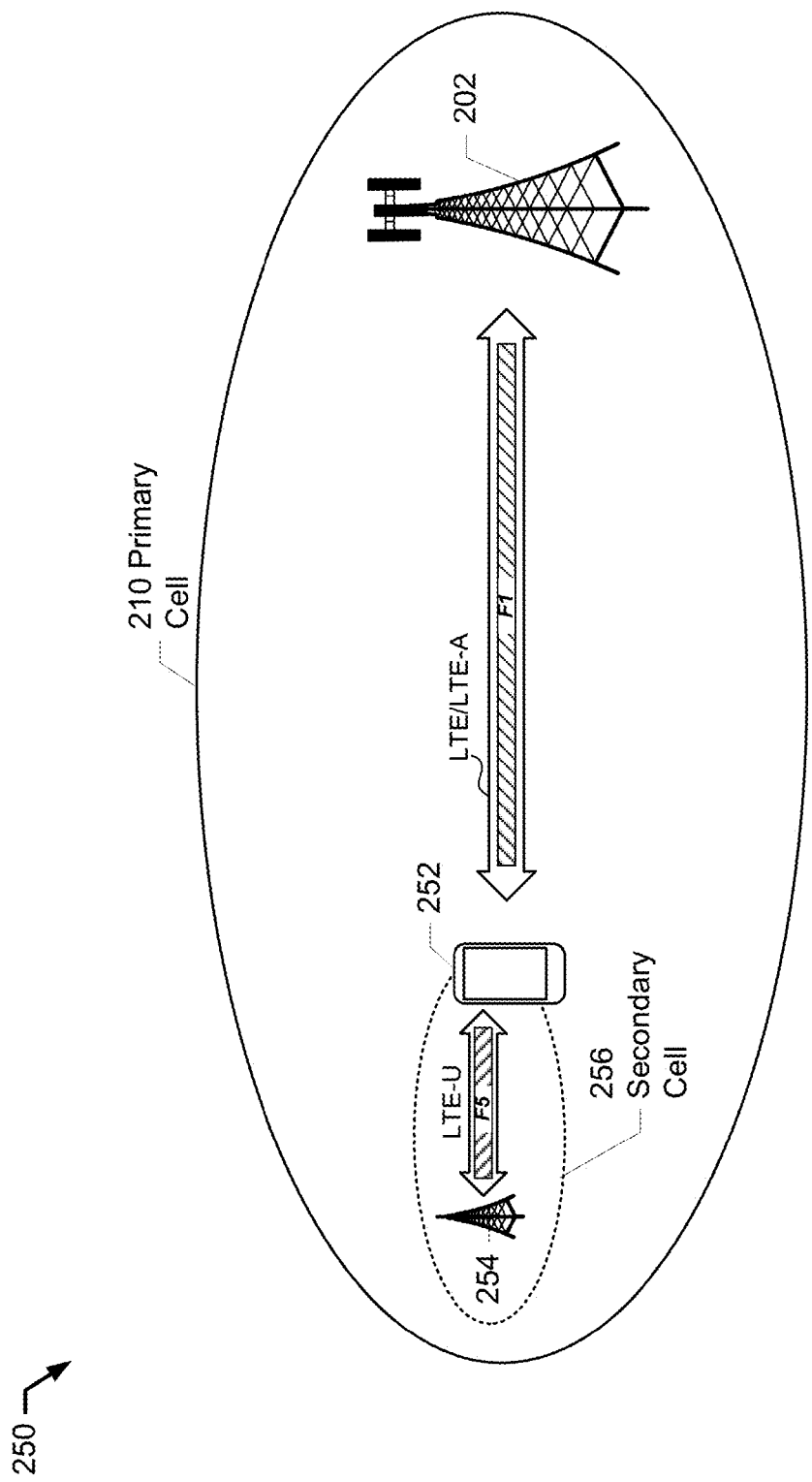

FIG. 2B illustrates a diagram 250 for another wireless communication network depicting a wireless communication device 252 in communication with the primary cell 210 via a primary component carrier at radio frequency F1 (in accordance with an LTE/LTE-A wireless communication protocol) and with a secondary cell 256 via a secondary component carrier at radio frequency F5. In some embodiments, the wireless network provider can operate the "small" cell 218 using a carrier in an unlicensed radio frequency band. The secondary carrier in the unlicensed radio frequency band can be referred to as an LTE-Unlicensed (LTE-U) carrier, and the LTE-U capable wireless communication device 252 can be operate in accordance with an LTE-U wireless communication protocol. As discussed further herein, the wireless network provider can, in some embodiments, provide for communication with the wireless communication device 252 using both the primary carrier in a licensed radio frequency band, e.g., via frequency resource F1, and the secondary carrier in an unlicensed radio frequency band, e.g., via frequency resource F5 in parallel. As the unlicensed radio frequency band can be shared by other non-cellular wireless communication devices, the cellular wireless network can seek to mitigate coexistence interference between communication on the secondary component carrier in the unlicensed radio frequency band and communication using an overlapping and/or adjacent set of frequencies used by other wireless communication devices, e.g., operating in accordance with a wireless local area network (WLAN) wireless communication protocol of which Wi-Fi protocols are a representative example. As unlicensed radio frequency bands can be shared by multiple network providers and/or by a variety of wireless network equipment, the LTE-U communication via the secondary component carrier F5 in the secondary cell 256 can be "managed" by the wireless network to mitigate interference into and received from other wireless communication devices, e.g., Wi-Fi equipment. The wireless network can include equipment to schedule transmissions over the secondary component carrier F5 to share the unlicensed radio frequency band among multiple LTE-U capable wireless devices, e.g., multiple different wireless communication devices 252. In some embodiments, a wireless network provider can also operate a wireless local area network device, e.g., a Wi-Fi "hot spot" (not shown), a secondary cell 256, and a primary cell 210 simultaneously and can manage communication via the three separate pieces of network equipment, e.g., a "managed" Wi-Fi "hot spot" access point, the secondary cell's eNodeB 254 (or a "femto cell" or equivalent), and the primary cell's eNodeB 202. The wireless network provider can manage the combination of network equipment in communication with multiple wireless communication devices to mitigate coexistence interference, to provide for offloading of traffic between various network equipment, to provide for selection by the wireless communication device 252 to establish connections via one or more of the various network equipment, to provide for reselection between various network equipment, to share communication using parallel component carriers, etc. In some embodiments, the wireless network provider can use a set of access network discovery and selection function (ANDSF) policy objects to provide for the management of communication using the multiple types of access network equipment, including a combination of eNodeB's 202, "small" cell network equipment 254, and managed WLAN (Wi-Fi) access points (not shown).

Figure 2C:
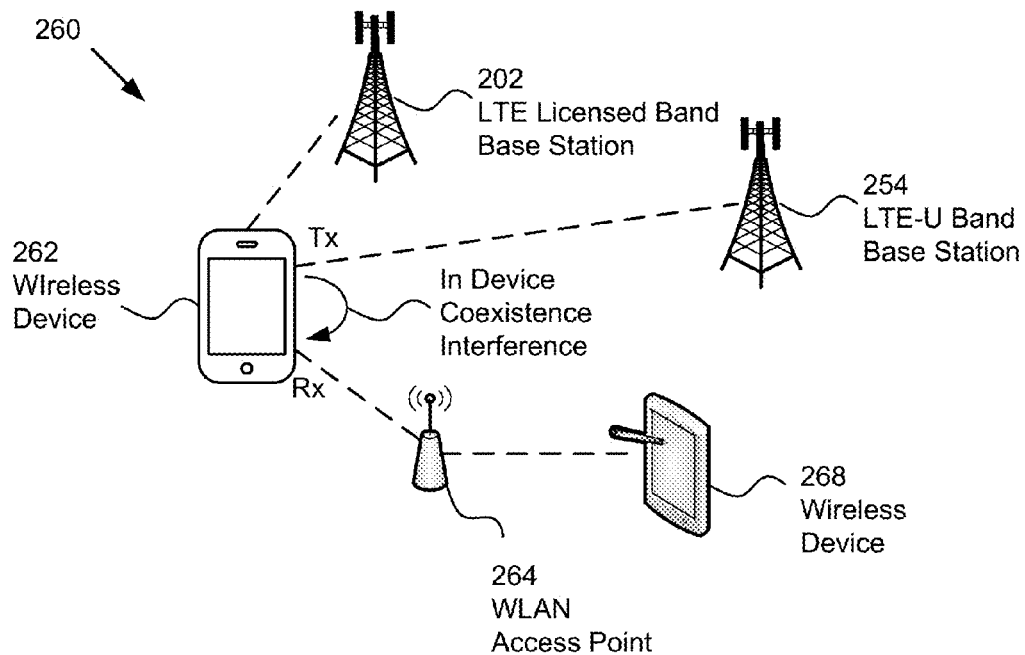
FIGS. 2C and 2D illustrate representative wireless communication systems including radio frequency coexistence interference in accordance with some embodiments.
Figure 2D:
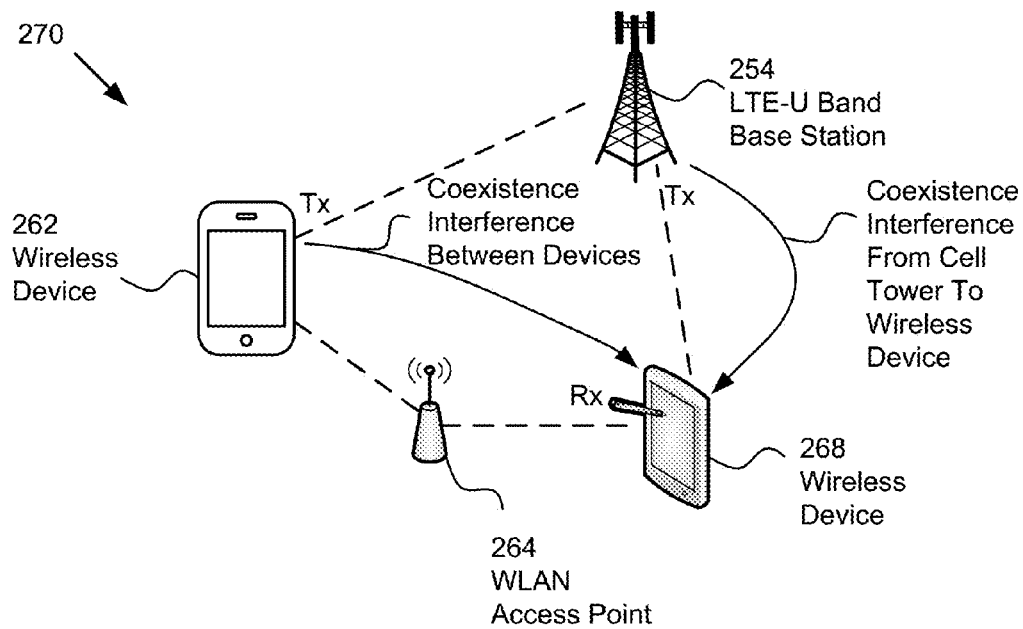

FIGS. 2C and 2D illustrate representative wireless communication systems that can experience radio frequency coexistence interference, in accordance with some embodiments. FIG. 2C illustrates a wireless communication system 260 in which a wireless communication device 262 can communicate simultaneously using a cellular wireless communication protocol, e.g., transmitting to a cell tower (base station) 202 over a primary component carrier in a licensed LTE frequency band and to a cell tower (base station) 254 over a secondary component carrier in an unlicensed radio frequency band, while also receiving communication in accordance with a WLAN wireless communication protocol from a WLAN access point 264. The WLAN access point can also communicate with another wireless communication device 268, which in some embodiments can operate only using a WLAN wireless communication protocol. The WLAN access point 264, together with the wireless devices 262 and 268, can form a WLAN that uses a particular radio frequency channel in an unlicensed radio frequency band. When the wireless device 262 transmits on the same radio frequency channel or on a radio frequency channel that overlaps with the WLAN radio frequency channel, e.g., to an LTE-U capable base station 254, the receiver of the wireless device 262 can encounter "in device" coexistence radio frequency interference. As the cellular transmitter and the WLAN receiver can be collocated in the wireless device 262, in some embodiments, the WLAN receiver and/or the cellular transmitter can undertake actions to mitigate effects of the "in device" coexistence radio frequency interference, e.g., by minimizing overlapping transmission times and/or changing use of frequency channels to provide for reduced radio frequency interference from the cellular transmitter into the WLAN receiver.

Radio frequency interference, however, can also occur between two different wireless devices or from access network equipment of a cellular wireless network (e.g., communicating with the same wireless device 268 as the wireless WLAN access point 264) as illustrated by the wireless communication system 270 in FIG. 2D. A cellular transmitter of a nearby wireless device 262 that communicates with the LTE-U capable base station 254 can not only interfere with its own WLAN receiver but also with the WLAN receiver of another wireless device, e.g., wireless device 268, which can seek to communicate with the WLAN access point 264 using the same frequency channel and/or using one or more overlapping radio frequency channels occupied by the LTE-U cellular transmitter of the wireless device 262. Similarly, a cellular transmitter of an LTE-U band base station 254 that communicates with one or more wireless devices, including for example the wireless device 268, can cause coexistence interference in the wireless device 268, which can seek to communicate with the WLAN access point 264 using the same and/or overlapping radio frequency channels as used by the cellular transmitter of the LTE-U band base station 254. In some embodiments, the wireless device 268 can seek to receive signals from both a WLAN access point 264 and from an LTE-U band base station 254 of a cellular wireless network. When both the WLAN access point 264 and the LTE-U band base station use the same radio frequency channel and/or one or more overlapping radio frequency channels, e.g., in an unlicensed radio frequency band, reception by the wireless device 268 of signals from the WLAN access point 264 and/or from the LTE-U band base station 254 (e.g., using separate parallel wireless circuitry) can interfere with each other. In some embodiments, the receiver of the wireless device 268 can listen for and detect radio frequency signals from nearby cellular transmitters, such as from the LTE-U band base station 254 or other wireless devices 262 that overlap and/or use the radio frequency channels used for WLAN communication and can seek to minimize and/or mitigate the effect of the radio frequency interference from the cellular transmissions. In some embodiments, transmissions of the wireless device 262 can be managed, e.g., by the wireless device 262 itself, and/or by wireless network equipment, e.g., via control signals provided through the LTE base station 202 and/or the LTE-U capable base station 254, to mitigate coexistence interference between the wireless devices 262 and 268. As described further herein, the wireless device 262 can transmit using a time division multiplexing scheme and/or using frequency hopping to share all or portions of the unlicensed radio frequency band with other wireless devices, e.g., with the wireless device 268.

In a typical WLAN communication system, e.g., based on a carrier sense multiple access (CSMA) protocol, a wireless client device, e.g., 268, can decode an incoming WLAN packet to determine its destination. As communication in the WLAN communication system can be "unscheduled," any incoming WLAN packet can be destined for the wireless client device 268. In some embodiments, the wireless client device 268 can detect and decode the preamble of the WLAN packet, and by doing so, the wireless client device 268 can determine whether the radio frequency channel (which can also be referred to as the "medium") is occupied for communication by another WLAN client device. WLAN communication protocols can require that signals at a level of −82 dBm or higher be detectable and decodable by the WLAN client device 268 and by the WLAN access point 264 in order for the CSMA mechanism to perform properly. In a typical WLAN client device 268, WLAN signals at a level of −90 dBm or higher can be detected and decoded. The detection and decoding, however, can rely on the presence of a preamble at the beginning of the WLAN packet for detection, and when communications do not include a detectable preamble, the WLAN client device 268 can rely instead on a simple energy detection mechanism to determine the presence of a radio frequency interferer.

The WLAN communication protocol can require that a radio signal having an energy level of −62 dBm or higher be detectable by the WLAN client device 268. This detectable energy level is for radio frequency signals that may or may not be decodable by the WLAN client device 268 and is substantially higher than the decodable level for formatted packets that include a preamble for detection by the WLAN client device 268. When detecting the energy of the interfering radio signal, which can also be referred to as measuring a received signal strength indication (RSSI) level of −62 dBm or higher, the WLAN client device 268B can acknowledge that the radio frequency channel is "busy" or otherwise "occupied" and can wait for a future "clear" transmission time. The WLAN client device 268 can thus "sense" the presence of a "carrier" in the radio frequency channel and provide for "fair" access to another WLAN device using the radio frequency channel. Both the wireless communication device 262 communicating using an LTE-U secondary component carrier and the WLAN client device 268 communicating using a WLAN wireless communication protocol can be subject to radio frequency interference when they attempt to occupy all or portions of the same radio frequency channel at the same time. Wireless packets for the LTE communication system and/or the WLAN communication system can be corrupted due to the radio frequency interference unless a proper detection and "back off" mechanism is employed. In some embodiments, a WLAN client device 268 and/or a WLAN AP 264 can scan one or more radio frequency channels in a radio frequency band (or in multiple radio frequency bands) to detect the presence of an LTE cellular system. The cellular transmissions of the wireless device 262 in the unlicensed radio frequency band can include gaps in time and/or can use different radio frequency channels over time to provide for "clear" transmission time intervals and/or radio frequency channels (or more generally portions of radio frequency spectrum in unlicensed radio frequency bands) during which the WLAN client device 268 can communicate with the WLAN AP 264. In some embodiments, all wireless communication devices 262 that use a secondary component carrier in a carrier aggregation scheme that operates using at least in part a frequency band that overlaps with the unlicensed radio frequency band, e.g., as used by the WLAN client device 268 and the WLAN AP 264, can be managed to provide for "clear" transmission times and/or "clear" radio frequency channels to permit "fair" sharing of the unlicensed radio frequency band among multiple wireless communication devices, including both LTE-U capable devices and WLAN (Wi-Fi) devices.

Figure 3A:
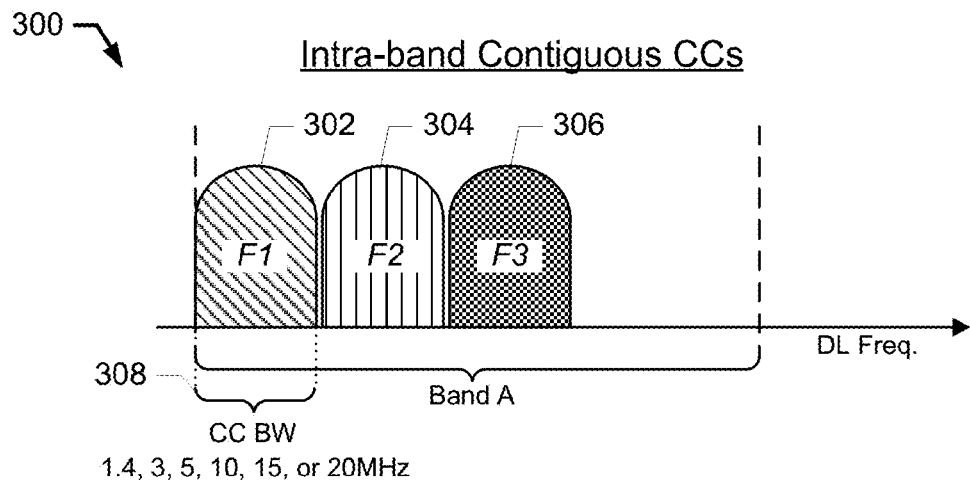
FIGS. 3A, 3B, and 3C illustrate three distinct carrier aggregation representations that depict two intra-band component carrier (CC) frequency resource diagrams and one inter-band CC frequency resource diagram, in accordance with various embodiments of the disclosure.
Figure 3B:
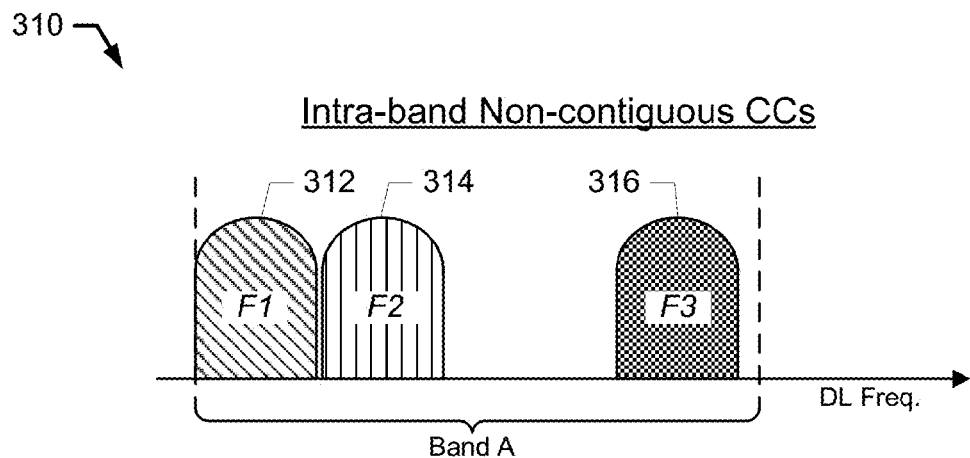
Figure 3C:
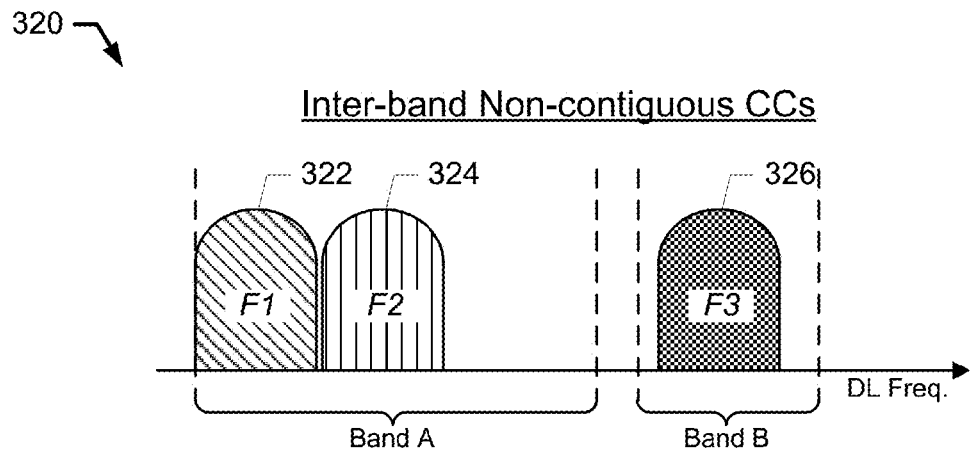

FIGS. 3A, 3B, and 3C illustrate three distinct carrier aggregation representations depicting two intra-band CC frequency resource diagrams, 300 and 310, and one inter-band CC frequency resource diagram 320, in accordance with various embodiments. As is generally understood, in 3GPP LTE and LTE-A, an individual CC can be limited to communicating at various designated system bandwidths 308 ranging from 1.4 MHz up to 20 MHz. As such, the cumulative DL data rate throughput achievable by using carrier aggregation scenarios can increase over the single carrier data-rate throughput of roughly 300 Mbits/sec. by a multiplier value, e.g., related to the number of CCs employed (up to 5CCs in LTE-A) in parallel and based on bandwidths of the constituent CCs. For telecommunication networks employing LTE-A, interoperability with predecessor LTE versions can require LTE-A CCs to employ a system bandwidth equivalent to earlier LTE version counterparts. As such, the peak single CC LTE-A system bandwidth can be capped at 20 MHz for inter-LTE RAT compatibility. However, in various carrier aggregation scenarios, an aggregate set of LTE-A CCs may be able to achieve cumulative bandwidths of up to 100 MHz (5CCs×20 MHz, the maximum LTE standard system bandwidth) using one or more allocated LTE spectrum bands.

FIG. 3A illustrates a carrier aggregation representation depicting an intra-band contiguous CC frequency resource diagram 300, where each aggregated CC, 302, 304, and 306, is associated with its own distinct frequency resource, F1, F2, or F3, within the same service provider designated DL frequency band, Band A. A frequency resource, in some embodiments, can also be referred to as a frequency carrier, carrier, or frequency channel. In the intra-band contiguous CC scenario, the three frequency resources, F1, F2, and F3, are sequential CC frequencies in the frequency domain positioned adjacent one another in Band A. FIG. 3B illustrates a carrier aggregation representation depicting an intra-band non-contiguous CC frequency resource diagram 310, where each aggregated CC, 312, 314, and 316, is associated with its own distinct frequency resource, F1, F2, or F3, within a single DL frequency band, Band A. However, in the intra-band non-contiguous CC scenario 310, the three frequency resources, F1, F2, and F3, can be CC frequencies that are respectively separated by one or more intervening frequency channels in the frequency domain, within Band A, e.g., as illustrated by the separation of frequency channels F2 and F3. FIG. 3C illustrates a carrier aggregation representation depicting an inter-band non-contiguous CC frequency resource diagram 320, where each aggregated CC, 322, 324, and 326, is associated with its own distinct frequency resource, F1, F2, or F3, spread across two service provider designated DL frequency bands, Band A and Band B. In the inter-band non-contiguous CC scenario, the frequency resources, F1 and F2, of Band A can be CC frequencies that are separated from the frequency resource F3 of Band B in the frequency domain. For reference, 3GPP LTE-A Release 10 specifies carrier aggregation for LTE, while LTE-A Releases 11 and 12 describe various carrier aggregation enhancements including various inter-band CC band pairings. It should be understood that telecommunications service providers generally operate using both similar and dissimilar licensed LTE frequency spectrum bands. For example, within the United States, Verizon's® LTE networks operate in the 700 and 1700/2100 Mhz frequency spectra using Bands 13 and 4, whereas AT&T's® LTE networks operate in the 700, 1700/2100, and 2300 MHz frequency spectra using Bands 17, 4, and 30. In addition to communicating via carrier aggregation using radio frequency channels in one or more licensed radio frequency bands, wireless network providers can provide for communicating using frequency resources in unlicensed radio frequency bands in parallel with licensed radio frequency bands, e.g., to supplement communication over a primary component carrier in a licensed radio frequency band with a secondary component carrier in an unlicensed radio frequency band.

Figure 3D:
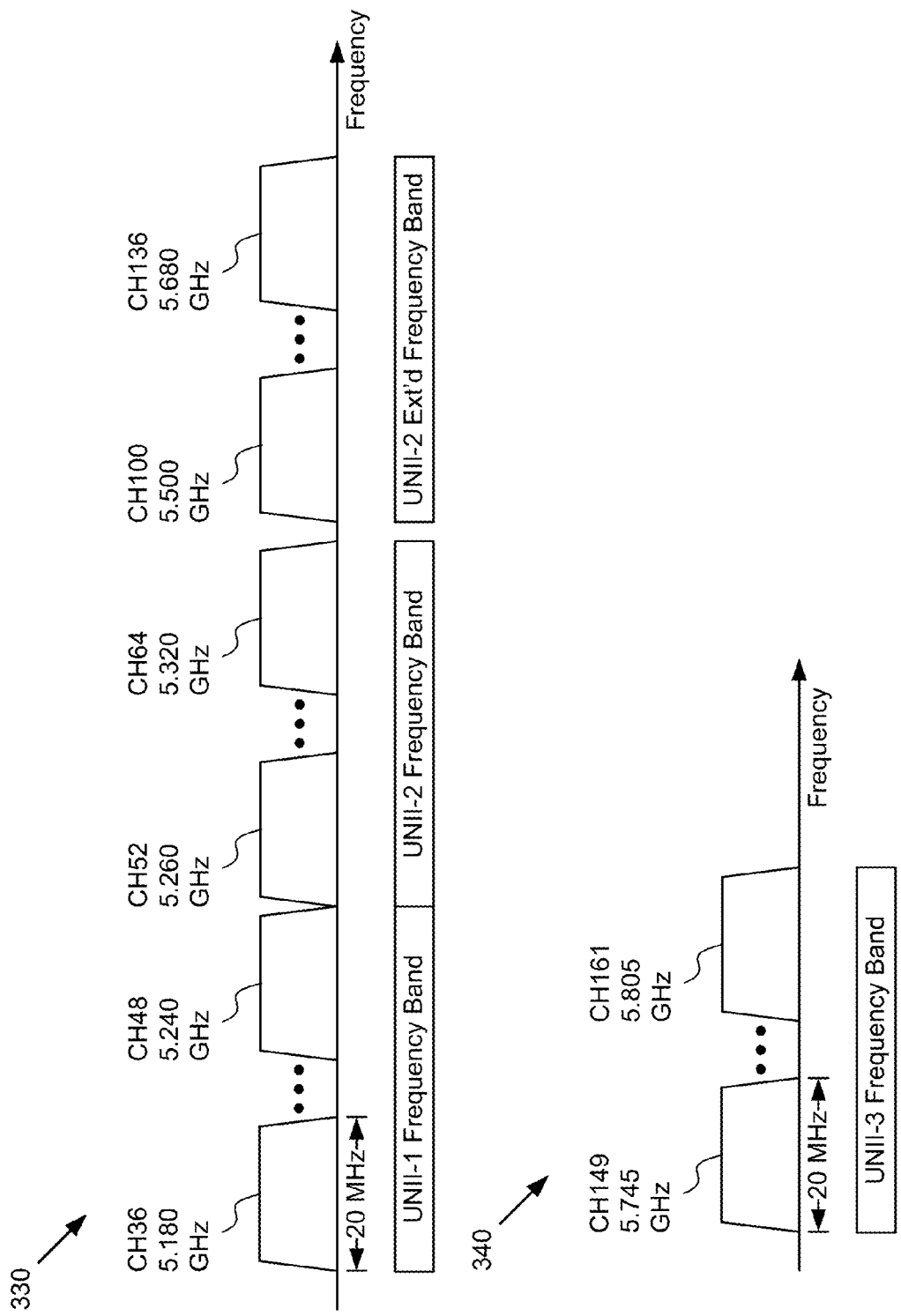
FIG. 3D illustrates a representative set of parallel radio frequency channel for use in an unlicensed radio frequency band by a wireless communication device, in accordance with some embodiments.
Figure 3E:
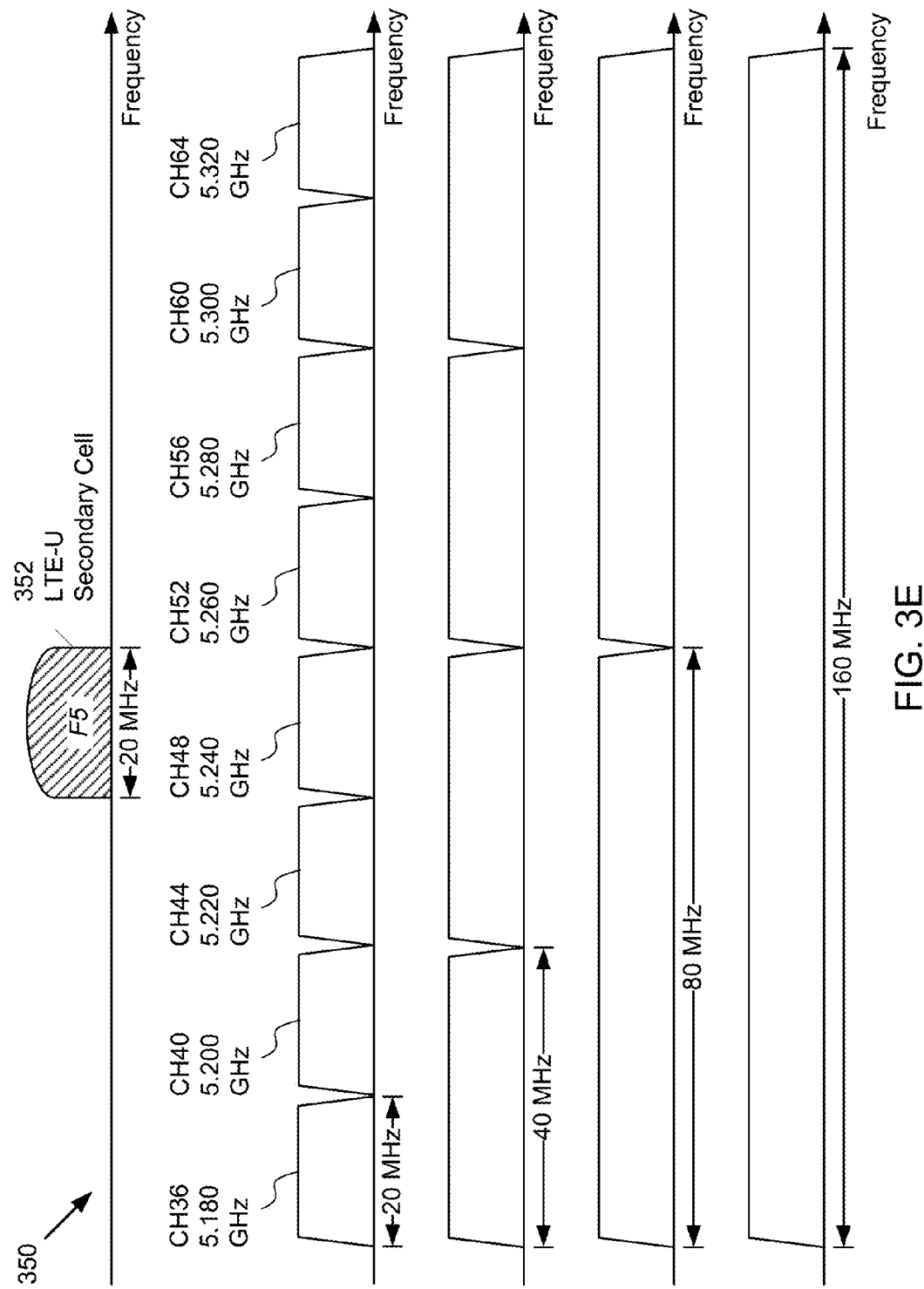
FIGS. 3E and 3F illustrate overlapping frequency channels of an LTE-U wireless communication system and a Wi-Fi wireless communication system.

FIG. 3D illustrates a set of radio frequency channels available for use by wireless local area network (WLAN) systems in an unlicensed radio frequency band, in accordance with some embodiments. A "client" WLAN device can be any wireless communication device capable of communicating via a wireless local area network (WLAN) technology, e.g., in accordance with a wireless local area network communication protocol. In some embodiments, the WLAN technology can include a Wi-Fi (or more generically a WLAN) wireless communication subsystem (which can also be referred to in some embodiments as a radio), the Wi-Fi wireless communication subsystem can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies. The set of 802.11 Wi-Fi communication protocols utilize a region of radio frequency spectrum in the Industrial, Scientific, and Medical (ISM) radio frequency bands, e.g., 2.4 to 2.5 GHz, and the "5 GHz" radio frequency band, e.g., spanning from approximately 4.9 to 5.8 GHz. The "higher" radio frequency bands can provide for wider radio frequency channels that offer more bandwidth and higher data rates. The "lower" radio frequency bands can provide a wider coverage area due to lower path loss and therefore greater range. Typically, WLAN client devices and WLAN access points offer the capability to operate in one or multiple unlicensed radio frequency bands. Additional radio frequency bands are planned for future use by WLAN wireless communication devices, and wireless communication protocol standards are being developed to use the additional radio frequency bands including those in the television "white space" frequencies, e.g. in the very high frequency (VHF) and ultra high frequency (UHF) bands, i.e., near 600 MHz, as well as at frequencies near 3.5 GHz. Radio frequency channels, used by WLAN client devices and WLAN access points in the 5 GHz unlicensed radio frequency band, can span approximately 20 MHz of radio frequency bandwidth as illustrated in FIG. 3D. In addition, WLAN client devices can use multiple 20 MHz radio frequency channels together to provide wider radio frequency bandwidth channels as illustrated in FIG. 3E. Thus, WLAN client devices may not only use 20 MHz wide frequency channels, but also 40 MHz, 80 MHz, and/or 160 MHz wide radio frequency channels. Higher bandwidth radio frequency channels can provide for higher data rate throughput, but can also be subject to more radio frequency interference from other wireless systems, transmissions from which can overlap with all or a portion of the WLAN radio frequency channels.

As illustrated by the diagram 350 in FIG. 3E, an LTE-U secondary cell 352 operating on a radio frequency channel F5 and occupying approximately 20 MHz of bandwidth, can overlap with all or a portion of radio frequency spectrum used by a WLAN system operating in the same frequency range of the unlicensed radio frequency band. For example, the LTE-U secondary cell 352 can operate using a frequency band that coincides with frequency channel CH48 centered at 5.240 GHz in the 5 GHz unlicensed radio frequency band. The LTE-U secondary cell 352 can also overlap in part wider bandwidth frequency channels that use additional frequency channels. To mitigate coexistence interference between communication systems that use the same radio frequency band with overlapping radio frequency channels, the cellular wireless network can include methods to share all or portions of the unlicensed radio frequency band, e.g., through time division multiplexing and/or frequency hopping techniques as described further herein.

Figure 3F:
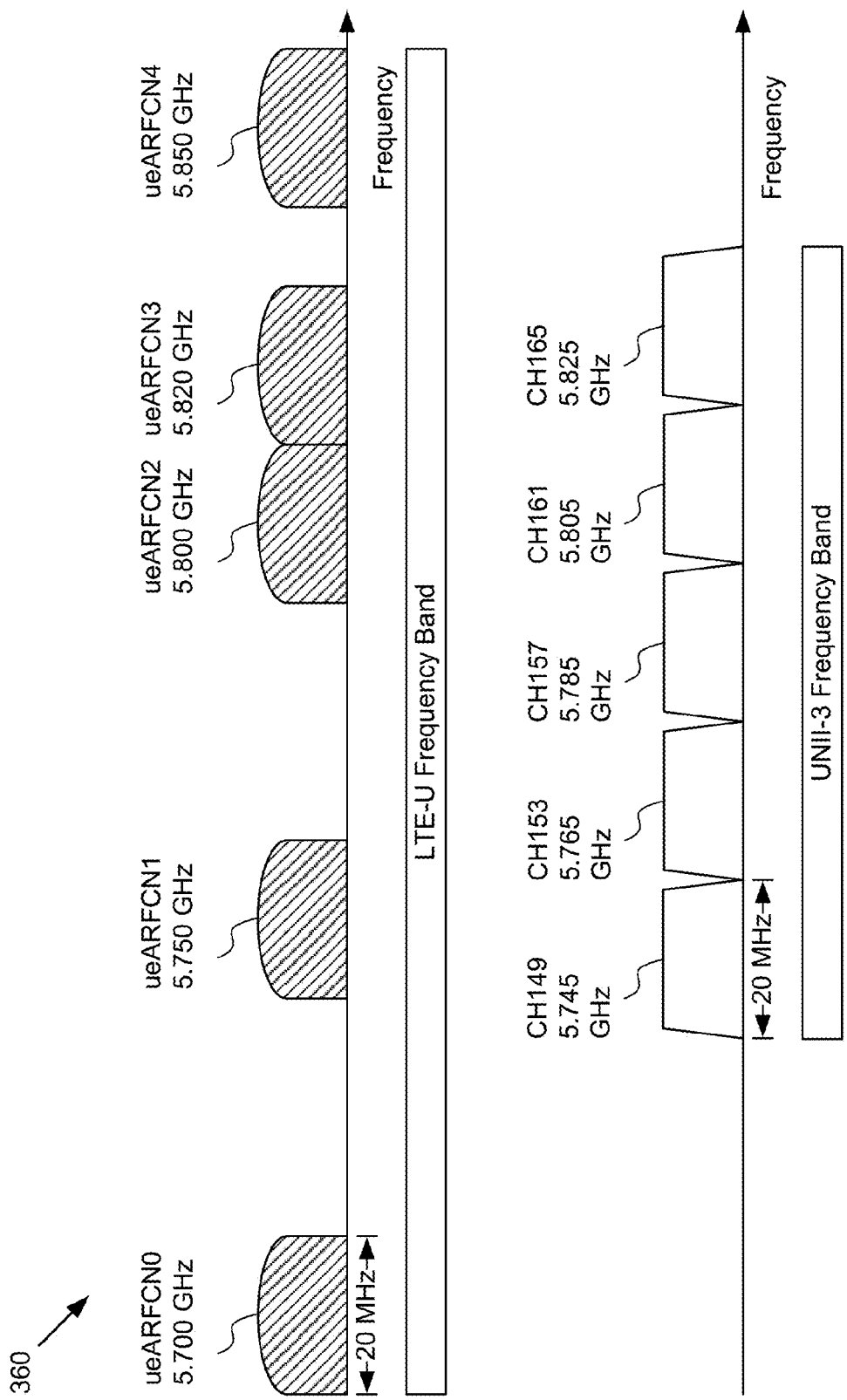

FIG. 3F illustrates a diagram 360 including a representative set of LTE-U radio frequency channels that span a portion of the 5 GHz unlicensed radio frequency band that can be used by a cellular wireless network. In some embodiments, a wireless network provider can use one or more of the set of LTE-U radio frequency channels to communicate with a wireless communication device, e.g., via a secondary component carrier for carrier aggregation. A primary component carrier in a licensed radio frequency band (not shown) can be used in parallel with one or more secondary component carriers to provide for carrier aggregation. The primary component carrier can be used to provide control signals to manage when and how to use the secondary component carriers in the unlicensed radio frequency band. In some embodiments, only one secondary component carrier in the unlicensed radio frequency band is used in parallel with the primary component carrier in the licensed radio frequency band. In some embodiments, multiple secondary component carriers in the unlicensed radio frequency band can be used, e.g., in parallel simultaneously and/or in series sequentially (or in a frequency hopping order). In some embodiments, the cellular wireless network can indicate a series of frequency channels on which the secondary component carrier can operate, e.g., using a frequency hopping scheme to change between different frequency channels over time. FIG. 3F illustrates a representative set of five different radio frequency channels in an LTE-U frequency band, which can be part of and/or overlap with an unlicensed radio frequency band, e.g., an unlicensed national information infrastructure (UNII) frequency band. One or more of the radio frequency channels used by the cellular wireless network in the LTE-U frequency band can overlap, at least in part, with one or more radio frequency channels in the UNII frequency band. Each radio frequency channel used in the LTE-U frequency band can be referred to by an unlicensed EUTRA absolute radio frequency channel number (ueARFCN) having a distinct radio frequency carrier value, e.g., 5.700 GHz, 5.750 GHz, 5.800 GHz, 5.820 GHz, or 5.850 GHz as illustrated in FIG. 3F. As would be understood by a person of ordinary skill in the art, the values for the radio frequency channels can vary from those shown, as other radio frequency carrier values can be equally appropriate to use. Similarly the number of radio frequency channels in the unlicensed radio frequency band used for frequency hopping can vary, i.e., including numbers fewer or greater than as illustrated in FIG. 3F. In general, the radio frequency channels used in the unlicensed radio frequency band can be non-overlapping, and in some cases separated from each other, e.g., as with ueARFCN0 and ueARFCN1 shown in FIG. 3F, or in some cases adjacent to each other, e.g., as with ueARFCN2 and ueARFCN3 shown in FIG. 3F. In some embodiments, an LTE-U frequency channel, e.g., ueARFCN0, can be non-overlapping with and separated from frequency channels used by a "non-cellular" wireless communication device, e.g., the frequency channels indicated for the UNII-3 frequency band. With sufficient frequency separation between the LTE-U frequency channel and UNII-3 frequency channels (and with sufficient attenuation of "out of band" energy for transmissions in the LTE-U frequency channel), the LTE-U frequency channel and the UNII-3 frequency channel may be used in parallel at the same time. In some embodiments, an LTE-U frequency channel, e.g., ueARFCN1, can overlap with one or more UNII-3 frequency channels, e.g., CH140 and CH153, and simultaneous transmission using the LTE-U frequency channel and one or more of the UNII-3 frequency channels can result in coexistence interference between multiple wireless communication devices attempting to share the same and/or overlapping frequency channels. In some embodiments, an LTE-U frequency channel, e.g., ueARFCN4, can be separated from but adjacent to a UNII-3 frequency channel, e.g., CH165, and "side band" energy, from transmissions in the ueARFCN4 frequency channel can result in coexistence interference with the reception of signals in the UNII-3 frequency band channel CH165.

To mitigate interference between communication using frequency channels in the LTE-U frequency band and communication using frequency channels in the UNII-3 frequency band, network equipment of the cellular wireless network can coordinate transmissions by wireless communication devices that use the LTE-U frequency band's frequency channels. In an embodiment, a set of radio frequency channels are used in accordance with a frequency hopping sequence by an LTE-U capable wireless communication device, the frequency hopping sequence being specified by one or more control messages communicated by network equipment of the cellular wireless network to the LTE-U capable wireless communication device. The network equipment can specify a particular set of frequency channels at different radio frequencies and can communicate a frequency-hopping pattern associated with the particular set of frequency channels to the LTE-U capable wireless communication device. Network equipment and the LTE-U capable wireless communication device can "hop" synchronously between different frequency channels in the LTE-U frequency band as specified by the control messages. In some embodiments, all LTE-U capable wireless communication devices controlled by an eNodeB and operating in accordance with an LTE-U wireless communication protocol can be configured, when using one or more secondary component carriers in an unlicensed radio frequency band, to communicate (transmit or receive) over different radio frequency channels according to a common radio frequency hopping pattern. Thus, all LTE-U capable wireless communication devices, e.g., operating under control of a common eNodeB, can change between different radio frequency channels in the LTE-U frequency band synchronously, leaving each radio frequency channel in the LTE-U frequency band (and in parallel unlicensed radio frequency bands) free of radio transmissions by the LTE-U compliant wireless communication devices for a period of time. The network equipment of the cellular wireless network can coordinate communication using the secondary component carrier among all of the LTE-U capable wireless communication devices to share the radio frequency channel when used, e.g., using a combination of time division, code division, and/or orthogonal frequency division multiplexing. Scheduling transmissions by the eNodeB (and/or by other wireless network equipment) can provide for sharing the unlicensed radio frequency band radio frequency channels among the LTE-U capable wireless communication devices efficiently.

Each radio frequency channel in the LTE-U frequency band can be available for use by the LTE-U capable wireless communication devices (and associated eNodeB network equipment) for a particular associated frequency hop duration that is specified in one or more control messages. The frequency hop duration can, in some embodiments, extend for a time period that does not exceed a maximum time interval according to a system frame number (SFN) counter. For example, for an LTE SFN of 10 bits, each increment of the SFN can correspond to a time unit specified by an LTE wireless communication protocol, e.g., a frame or a transmission time interval (TTI) or other well-understood time period. Frequency hop time durations can be specified using an SFN value, e.g., an "absolute" time value and/or by a number of SFN increments, and the eNodeB can configure the wireless communication devices that use secondary component carriers in the LTE-U frequency band with a value for the SFN of the "next" hop, with each LTE-U capable wireless communication device hopping synchronously to a next frequency channel together. The eNodeB can also configure the LTE-U capable wireless communication device with a current frequency channel to use, a next frequency channel to use, and/or with a set of radio frequency channels to use in a particular frequency-hopping pattern. The eNodeB can also specify time durations for each frequency channel in the frequency hopping pattern.

In an embodiment, when a wireless communication device is configured to operate with a secondary component carrier in an unlicensed radio frequency band, the eNodeB can specify a frequency channel on which to operate. The secondary cell, under the control of the eNodeB, can change the frequency channels that it uses according to a frequency-hopping pattern among a set of frequency channels, using each frequency channel for a particular time duration specified by the eNodeB. In general, the frequency channel hopping pattern can include a time duration that each frequency channel is used. The eNodeB can specify an "absolute" time and a frequency channel at which a "next" (i.e., subsequent and immediately following) frequency channel is to be used for the wireless communication device that is configured to operate in the unlicensed radio frequency band using the secondary component carrier. The "absolute" time can be specified using a counter value, e.g., an SFN value. In some embodiments, a "absolute" time value can be used to start a frequency hopping pattern, and a "relative" time value, e.g., a number of frames or transmission time intervals or other recognized time unit, can be used to specify time period durations for each frequency channel among which the wireless communication device (and the eNodeB) can hop according to a frequency-hopping pattern. In some embodiments, the frequency-hopping pattern of frequencies and associated time values for hopping are provided by the eNodeB to the LTE-U capable wireless communication devices. For example, the eNodeB can specify a pattern of {ueARFCN0, ueARFCN3, ueARFCN1, ueARFCN4, ueARFCN2} with associated timing values of {64, 64, 128, 64, 256}. The timing values, in an embodiment, can represent a recognized time unit, e.g., milliseconds, frames, transmission time intervals, etc. The frequency-hopping pattern can start with an initial frequency channel at a particular time, e.g., specified by an SFN value, and can cycle through the different frequency channels according to the frequency-hopping pattern based on timing values specified. The cycle of frequency hopping can repeat until a new frequency-hopping pattern and/or a change to the existing frequency-hopping pattern is provided by the eNodeB to the LTE-U capable wireless communication devices.

Transmissions by the wireless communication device(s) and the eNodeB on the secondary component carrier can switch between different frequency channels according to the specified frequency-hopping pattern, e.g., based on expiration of a timer at the wireless communication device and/or a timer at the eNodeB, so that both the eNodeB and all LTE-U capable wireless communication devices having a secondary component carrier in the secondary cell that uses the unlicensed radio frequency band switch to the next frequency channel synchronously in accordance with the specified frequency-hopping pattern. By synchronizing the eNodeB communication with all wireless communication devices on the secondary component carrier to switch between different frequency channels at the same time, the unlicensed radio frequency spectrum of the frequency channel vacated by the LTE-U capable wireless communication devices can be used for a period of time by other wireless communication devices, e.g., WLAN (Wi-Fi) devices. Any WLAN (Wi-Fi) radio frequency channels occupied by secondary component carriers for a particular secondary cell of the eNodeB can be continuously occupied at most for a single time period for a particular frequency channel in accordance with the frequency hopping pattern. During all remaining time periods of the frequency hopping pattern, the particular radio frequency channel can be at least in part not occupied (depending on overlapping frequency spectrum covered by the UNII-3 frequency band channels and the LTE-U frequency band channels). In some embodiments, e.g., when the WLAN (Wi-Fi) device uses a wide bandwidth channel that can span multiple LTE-U frequency band channels, the frequency hopping pattern can preferentially hop to "widely separated" frequency channels, at least as possible within a set of frequency channels available to the eNodeB, to minimize the probability of "continuous" or length time periods of coexistence interference between communication on the LTE-U frequency channels and on the WLAN (Wi-Fi) frequency channel. In some embodiments, the eNodeB can provide multiple secondary cells that each use different sets of LTE-U frequency channels, each with their own frequency hopping pattern. In some embodiments, the eNodeB can provide multiple secondary cells that each use a common set of LTE-U frequency channels but only hop to a subset of the common set of frequency channels for a particular frequency hopping pattern. In some embodiments, the eNodeB can select a frequency hopping pattern based on detection of a set frequencies at which WLAN coexistence interference can likely occur, e.g., based on radio frequency measurements of various spectral bands by the eNodeB and/or by wireless communication devices in communication with the eNodeB. The eNodeB can select radio frequency channels in the LTE-U frequency band having a "least likelihood" of interfering with radio frequency channels used by non-cellular wireless devices in the unlicensed radio frequency band. In some embodiments, the eNodeB adapts the set of LTE-U frequency channels used, the frequency hopping pattern used, the time duration for one or more LTE-U frequency channels of the frequency hopping pattern, or a combination of these based on a detection of WLAN frequency channels (or frequency bandwidth) used and/or based on information provided and/or obtained from other network elements and/or from the LTE-U capable wireless communication devices.

Figure 3G:
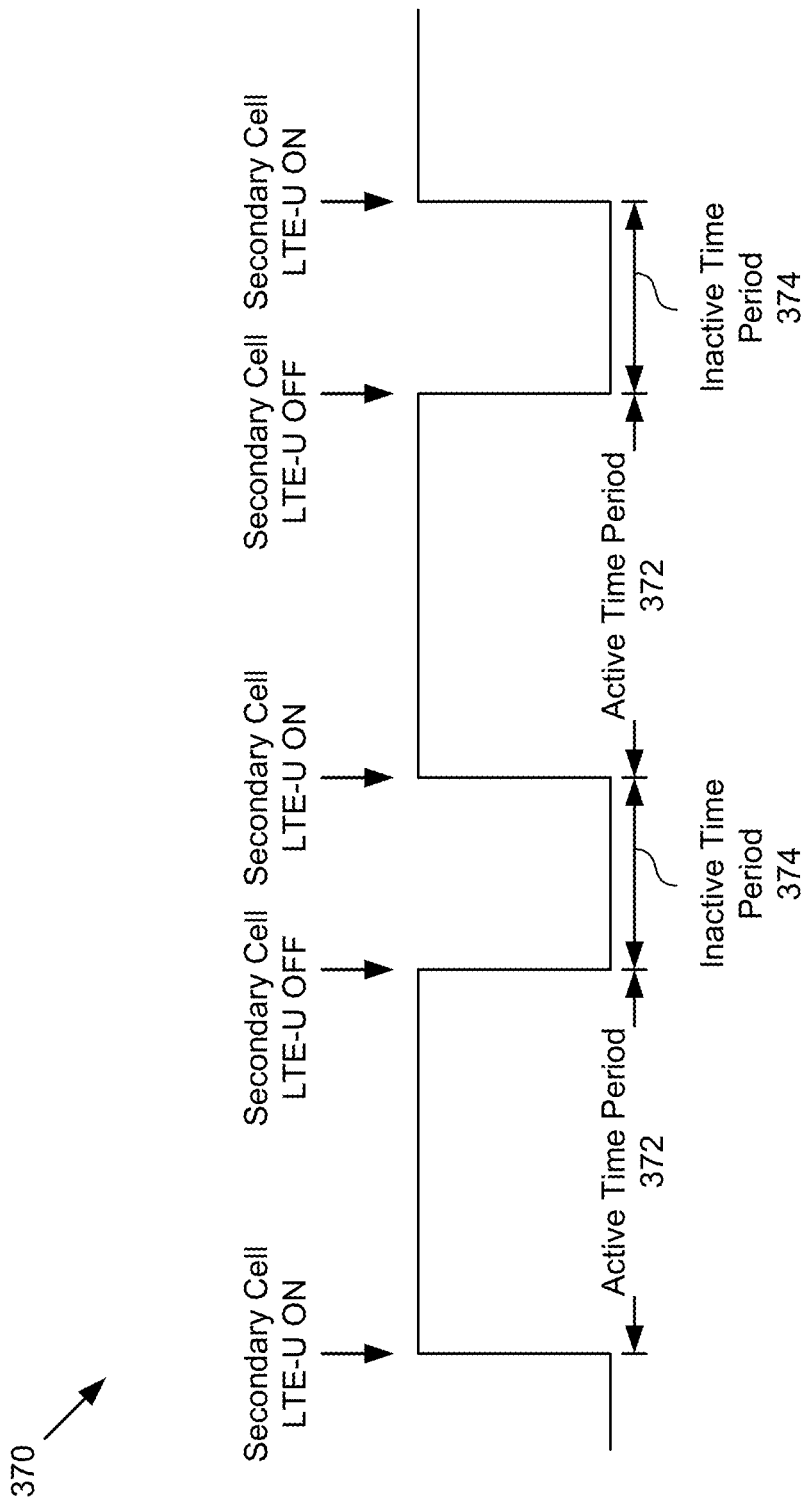
FIG. 3G illustrates a representative time division multiplexing method for communication in shared unlicensed radio frequency bands, in accordance with various embodiments of the disclosure.

FIG. 3G illustrates a diagram 370 of a time-division multiplexing scheme that can be used to mitigate coexistence interference between a set of one or more LTE-U capable wireless communication devices and other non-cellular wireless communication devices that share an unlicensed radio frequency band, in accordance with some embodiments. (In some embodiments, a multi-mode wireless communication device that includes a cellular wireless subsystem and a WLAN wireless subsystem can be configured to operate in a "non-cellular" mode, e.g., connected via a WLAN, in which case, such a configured multi-mode wireless communication device can also be considered a "non-cellular" wireless communication device, at least when so configured, e.g., when not actively connected with a cellular wireless network.) As described herein, wireless communication devices that operate in unlicensed radio frequency bands in accordance with a wireless local area networking (WLAN) wireless communication protocol, e.g., a Wi-Fi wireless communication protocol, can use a random access procedure that "senses" the presence of radio frequency transmissions in a radio frequency channel before attempting communication and "backs off" for a random time interval if another wireless communication device is determined to be transmitting on the radio frequency channel. To provide for gaps of time, in which a set of LTE-U capable wireless communication devices do not transmit or receive communication using one or more radio frequency channels in the unlicensed radio frequency band, e.g., for a radio frequency channel associated with a secondary component carrier of a secondary cell used for carrier aggregation by a wireless cellular network, the eNodeB of the secondary cell, and all wireless communication devices using the secondary component carrier of the secondary cell, can be synchronized to alternate between "active" time periods 372 and "inactive" time periods 374, e.g., as illustrated by the diagram 370 of FIG. 3G. During an "active" time period 372, the eNodeB and/or one or more of the LTE-U capable wireless communication devices can be scheduled to transmit or receive via the secondary component carrier of the secondary cell that operates in the unlicensed radio frequency band. The eNodeB can schedule the transmissions during the "active" time periods 372 to ensure that transmissions of multiple LTE-U capable wireless communication devices do not overlap or interfere with each other. During the "active" time period 273, however, transmissions of non-cellular wireless communication devices that share at least a portion of the same frequency channel in the unlicensed radio frequency band as used by the secondary component carrier can be impacted, depending on levels of coexistence interference that the non-cellular wireless communication devices experience. As illustrated in FIG. 3G, all LTE-U wireless communication devices, including the eNodeB, can share the secondary component carrier frequency channel during an active time period 372 and can be silent (i.e., not transmit or receive using the secondary component carrier frequency channel) during an inactive time period 374. The set of LTE-U capable wireless communication devices can be synchronized to be "on" and "off" during the same time periods in order to provide "quiet" time intervals during which non-cellular wireless communication devices can communicate, e.g., wireless device 268 connected to WLAN access point 264 as illustrated in FIG. 2D. The eNodeB can schedule and communicate how and when to use of the secondary component carrier in the unlicensed radio frequency band through control messages communicated over a primary component carrier in a licensed radio frequency band, which can be separate from and not interfere with the unlicensed radio frequency band communication. The LTE-U capable wireless communication devices that are configured to use a secondary component carrier in a secondary cell will also be connected with an associated eNodeB through a primary component carrier in an licensed radio frequency band, and the primary component carrier can be not subject to the time based sharing shown in FIG. 3G for the secondary component carrier in the unlicensed radio frequency band. In some embodiments, all secondary cells controlled by an eNodeB and operating in an unlicensed radio frequency band can be subject to time sharing, and all LTE-U capable wireless communication devices that use the secondary component carrier in the secondary cell can be subject to time sharing according to a common schedule, i.e., simultaneously silent during the inactive time periods 374, and scheduled to communicate (as indicated by an eNodeB) during the active time periods 372. In some embodiments, the eNodeB indicates to an LTE-U capable wireless communication device that a secondary cell operates in an unlicensed radio frequency band and is subject to time sharing, e.g., using control messages at the radio resource control (RRC) layer. In some embodiments, configuration commands used for dedicated secondary cells and/or for common secondary cells, e.g., radioResourceConfigDedicatedSCell and/or radioResourceConfigCommonSCell commands, can include fields, information elements, or other designated blocks, that can provide information about the radio frequency channels of an unlicensed radio frequency band. In some embodiments, an eNodeB can activate and deactivate an LTE-U secondary cell for use with one or more LTE-U capable wireless communication devices using a medium access control (MAC) control element. The eNodeB can configure each LTE-U secondary cell with a set of timers and a starting time, e.g., using SFN values. In some embodiments, a set of "absolute" times specified by SFN timer values can indicate when "ON" cycles and/or "OFF" cycles for the LTE-U secondary cell can occur. In some embodiments, the SFN timer value can provide an indication of the beginning of an "ON" cycle and/or the beginning of an "OFF" cycle, and another set of indicators can provide the length of the "ON" cycles and/or the length of the "OFF" cycles. In some embodiments, the eNodeB and the LTE-U capable wireless communication devices can maintain one or timers that can provide an indication of an LTE-U ON time for the secondary cell, i.e., the start of the active time period 372, as indicated in FIG. 3G, and an indication of an LTE-U OFF time for the secondary cell, i.e., the start of the inactive time period 374. The LTE-U capable wireless communication devices can communicate with an eNodeB using a primary component carrier of a primary cell during the inactive time periods and can communicate using a combination of the primary component carrier in a licensed radio frequency band and an LTE-U secondary component carrier in an unlicensed radio frequency band during the active time periods. The ON/OFF cycle indicated in FIG. 3G can apply to all secondary cells for a particular eNodeB, to a particular secondary cell for a particular eNodeB, to any secondary cell in an unlicensed radio frequency band within a particular geographic area, to a set of secondary cells in an unlicensed radio frequency band, to a set of secondary cells that share a common frequency channel in an unlicensed radio frequency band, to a set of secondary cells that share a set of common frequency channels in an unlicensed radio frequency band (e.g., a set of unlicensed radio frequency band frequency channels used with a frequency-hopping pattern), or to a particular frequency channel or set of frequency channels specified by an eNodeB, which can correspond to one or more secondary cells. The eNodeB can manage the use of radio frequency channels in the unlicensed radio frequency band dynamically, e.g., changing over time of day, day of week, based on loading conditions, based on measured and/or reported interference levels, or based on other performance metrics for radio frequency interference and/or network operating conditions. In some embodiments, an inactive time period 374 can span a time sufficient for a WLAN (Wi-Fi) wireless communication device to sense the radio frequency channel's availability and transmit successfully one or more wireless packets according to a WLAN (Wi-Fi) wireless communication protocol. In an embodiment, the inactive time period is at least 20 milliseconds. In another embodiment, the inactive time period is at least 40 milliseconds. In some embodiments, the inactive time periods' lengths and/or the active time periods' lengths are determined dynamically by the eNodeB or by other network equipment of the cellular wireless network.

A cellular wireless network can use a set of access network discovery and selection function (ANDSF) policy objects to provide for management of radio frequency channels in unlicensed radio frequency bands, in addition to radio frequency channels in licensed radio frequency bands. In some embodiments, existing ANDSF policy objects can be extended to include fields to specify properties of cells and/or frequency channels in unlicensed radio frequency bands. ANDSF policies can be managed and/or controlled by one or more network equipment entities in an evolved packet core (EPC) of an LTE/LTE-A cellular wireless network. The ANDSF policies can provide functions by which a wireless communication device can discover and select access networks for communication, including in some embodiments, non-3GPP wireless access networks, e.g., WLANs. A wireless communication device can include ANDSF policy elements that can provide for "inter-system" mobility and "inter-system" routing behaviors according to an Intersystem Mobility Policy (ISMP) and an Intersystem Routing Policy (ISRP). Using the ISMP and ISRP rules, a wireless communication device can re-select between different wireless networks, e.g., transfer a connection between a cellular wireless network and a non-cellular wireless network, and/or offload all or a portion of communication between a cellular wireless network and a non-cellular wireless network. ANDSF policy rules can be provisioned by wireless network operators to a wireless communication device using an Open Mobile Alliance (OMA) device management (DM) protocol. OMA-DM protocols can provide for provisioning, configuring, feature enabling, feature disabling, device upgrading, fault detection, fault reporting, and/or other wireless communication device management functions. In some embodiments, an ISMP defines network selection rules for a wireless communication device that can have no more than one active network connection at a time, e.g., to an LTE/LTE-A cellular wireless network or to a non-cellular, e.g., WLAN/Wi-Fi, wireless network. The ISMP rules can provide for "mobility" to move connections of a wireless communication device between the LTE/LTE-A cellular wireless network and the non-cellular wireless network, e.g., in either direction. The ISRP rules can provide for network selection by a wireless communication device that can support multiple active network connections, e.g., to an LTE/LTE-A cellular wireless network and to a non-cellular WLAN/Wi-F wireless network, simultaneously. The ISRP rules can provide for "offloading" of data communication from the cellular wireless network to the non-cellular wireless network, in some embodiments.

An ANDSF mobility object policy extension for ISMP can include information about interference levels in one or more cells and/or loading for cells and/or access network nodes (e.g., eNodeBs) that can be used by network equipment and/or by wireless communication devices to determine behavior associated with network selection/re-selection. For example, ISMP rules can be added to one or more policies including information concerning cell identifiers (cell IDs) for one or more different cells that use unlicensed radio frequency bands. The ISMP policies can also be extended to include information about levels of interference in unlicensed radio frequency channels and/or across unlicensed radio frequency bands or portions thereof used for LTE-U communication by one or more secondary cells. The ISMP policies can also be extended to include information about levels of interference in unlicensed radio frequency channels and/or across unlicensed radio frequency bands or portions thereof used for WLAN (Wi-Fi) communication. Policy rules can be extended to provide for WLAN reselection that account for LTE-U interference levels and/or WLAN (Wi-Fi) interference levels. In some embodiments, reselection rules for reselecting from a cellular wireless network to a WLAN can include a level of LTE-U interference in radio frequency channels shared by WLAN channels. When LTE-U interference is high in WLAN channels, e.g., LTE-U channels deployed by a wireless network provider can interfere with managed or unmanaged WLANs, the wireless communication device can be directed, using the policy rules, to not reselect to one or more WLANs. In some embodiments, reselection and/or offloading rules can account for existing WLAN interference and/or LTE-U loading, and when the WLAN interference levels are high and/or the LTE-U loading levels are high, an eNodeB can be configured to not offload communication of one or more wireless communication devices from the cellular wireless network to the LTE-U wireless network or to a WLAN. In some embodiments, LTE-U interference levels can be measured by network equipment, e.g., eNodeB's in an access portion of the cellular wireless network, and/or by wireless communication devices that report to eNodeB's of the cellular wireless network. Similarly, WLAN interference can be measured for one or more LTE-U radio frequency channels of interest. The eNodeB's can also keep track of LTE-U loading in the cellular wireless network (i.e., loading of radio frequency channels in the unlicensed radio frequency band used for one or more secondary cells by the eNodeBs). In some embodiments, a new radio access technology "destination" can be added to specify an LTE-U (LTE-Unlicensed) RAT as one of a list of destinations indicated in one or more RRC rules. Parameters for LTE-U interference, WLAN interference, LTE-U loading, LTE-U RAT destinations, and/or LTE-U cell identifiers can be provided by an eNodeB to wireless communication devices using one or more dedicated control messages (e.g., via an RRC connection) and/or system information block (SIB) messages. In some embodiments, information about existing, current, past, predicted, and/or estimated levels of interference (LTE-U and/or WLAN) on unlicensed radio frequency channels and/or in unlicensed radio frequency bands can be provided to wireless communication devices by the eNodeB and/or can be measured by wireless communication devices and provided to the eNodeB. In some embodiments, an eNodeB can measure interference levels, e.g. from WLAN transmissions and/or from LTE-U transmissions and can provide the information to the wireless communication devices. In some embodiments, an eNodeB can provide configuration information to one or more wireless communication devices to measure interference levels on one or more radio frequency channels in one or more unlicensed radio frequency bands. In some embodiments, the wireless communication device can receive a list of WLAN radio frequency channels in an unlicensed radio frequency band that the eNodeB plans to use for "managed" WLAN deployments and/or for "scheduled" LTE-U secondary cells. The LTE-U capable wireless communication device can measure interference levels in one or more of the unlicensed radio frequency band's radio frequency channels specified by the eNodeB, e.g., interference levels from other wireless network providers, from WLAN access points, from WLAN client devices, or from other overlapping cells of the wireless network provider that can share the unlicensed radio frequency band. The LTE-U capable wireless communication device can provide all or part of the measured interference information to the eNodeB's. In some embodiments, the LTE-U capable wireless communication device includes a WLAN wireless subsystem (including a transceiver), which can be used to measure interference in unlicensed radio frequency band radio frequency channels, as seen by a WLAN transceiver, and the measured interference information from the WLAN transceiver can be provided by a cellular wireless subsystem of the LTE-U capable wireless communication device to the eNodeB's.

An ANDSF policy object for offloading, e.g., as specified in an ISRP, can include rules for offloading that extends to LTE-U capable wireless communication devices. In some embodiments, offloading rules can be provided by a cellular wireless network to a wireless communication device including specific assistance information about wireless network configurations and/or conditions, e.g., frequency bands used, frequency channels used, etc. In some embodiments, the LTE-U capable wireless communication device can determine whether reselection to a WLAN and/or offloading to a WLAN can be accomplished using the network provided assistance information. The LTE-U capable wireless communication device can make decisions on reselection and/or offloading based on the network information in conjunction with one or more rules provided by the cellular wireless network, as well as on measurements performed by and/or provided to the wireless communication device. In some embodiments, an LTE-U capable wireless communication device includes an LTE wireless subsystem and a WLAN wireless subsystem, which can each be used separately or in parallel. In some embodiments, the LTE-U capable wireless communication device can obtain information about operating conditions from the LTE wireless subsystem and/or the WLAN wireless subsystem, including across one or more radio frequency channels in an unlicensed radio frequency band, in order to determine whether to perform network reselection and/or network offloading. For example, a WLAN wireless subsystem can provide information about WLAN conditions from the perspective of communication using WLAN wireless communication protocols to the LTE wireless subsystem. The LTE wireless subsystem can use the WLAN wireless subsystem's provided information in conjunction with information (e.g., measurements) that the LTE wireless subsystem performs to determine reselection and/or offloading actions. In some embodiments, the wireless communication device provides information (e.g., measurements from an LTE wireless subsystem and/or from a WLAN wireless subsystem) to the eNodeB (or other equivalent access network equipment), and the eNodeB makes a determination about reselection and/or offloading between the cellular wireless network and a WLAN network. The eNodeB can use information provided by multiple wireless communication devices that can communicate via a secondary component carrier in a secondary cell to inform decisions for reselection and/or offloading for a wireless communication device (i.e., the eNodeB can have access to information not available direction to the wireless communication device). In some embodiments, an ISRP can be extended to include information about interference levels in LTE-U frequency channels or frequency bands, interference levels in WLAN frequency channels or frequency bands, and network equipment loading in LTE-U frequency channels or frequency bands. In some embodiments, the ISRP extensions can include specific information about LTE-U interference, WLAN interference, and/or LTE-U loading, for each of several different service types, e.g., for "flow based" routing, for "service based" routing, and/or for "non-seamless" offloading. Information for each type of interference and/or loading can be provided for different flow routing types and/or offloading types for an ANDSF ISRP.

Figure 4A:
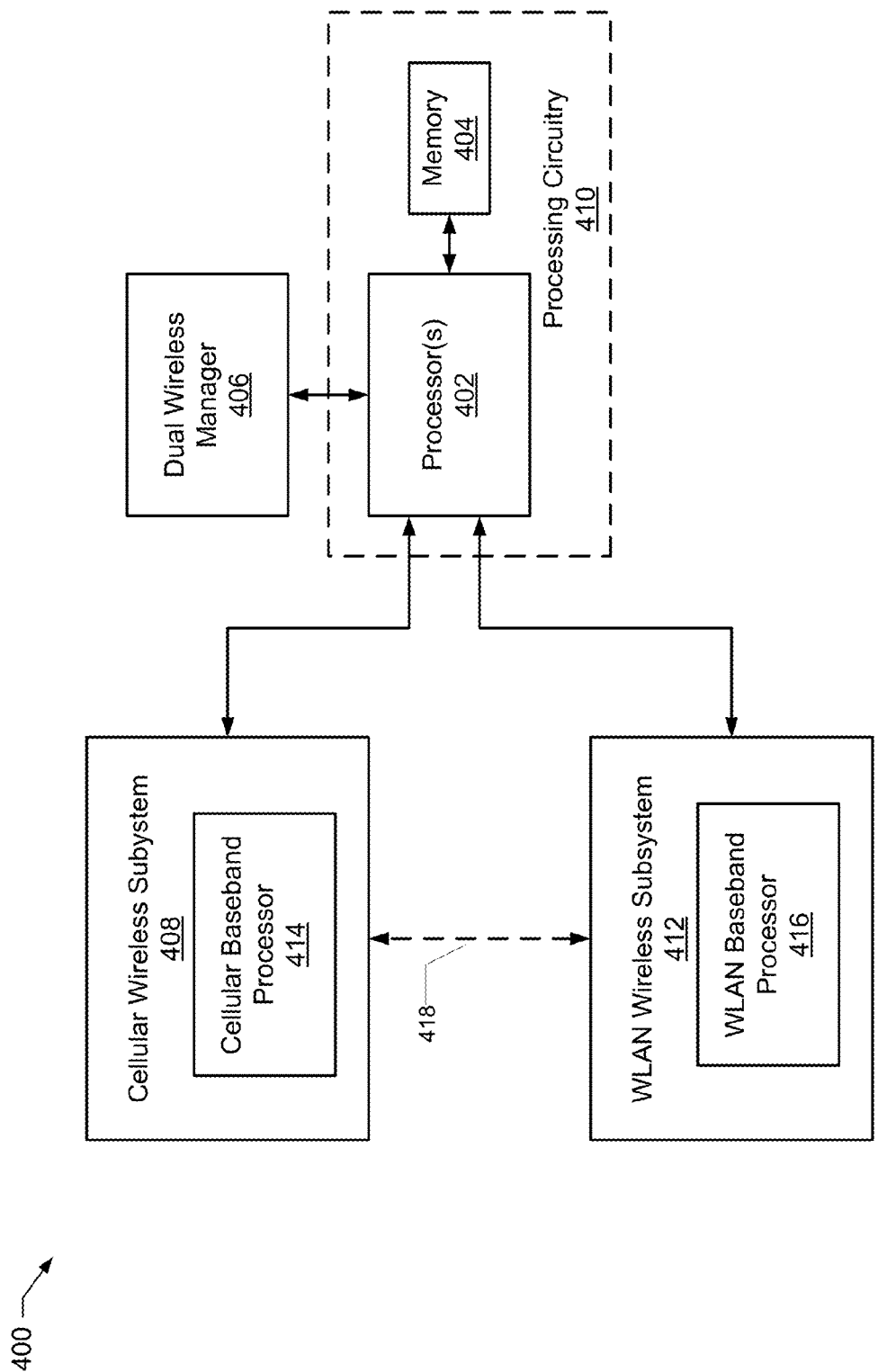
FIGS. 4A and 4B illustrate block diagrams of wireless communication devices, in accordance with various embodiments of the disclosure.

FIG. 4A illustrates a block diagram of an apparatus 400 that can be implemented on an LTE-U capable wireless communication device, in accordance with some example embodiments. It will be appreciated that the components, devices or elements illustrated in and described with respect to FIG. 4A may not be mandatory and thus some may be omitted in certain embodiments. Additionally, some embodiments can include further or different components, devices or elements beyond those illustrated in and described with respect to FIG. 4A. Further, it will be appreciated that, in some example embodiments, one or more components of the apparatus 400 can be distributed across a plurality of computing devices that can collectively provide the functionality of an LTE-U capable wireless communication device to operate using multiple radio frequency bands, including carrier aggregation via a primary component carrier in a licensed radio frequency band and a secondary component carrier in an unlicensed radio frequency band. The apparatus 400 can provide for management of communication in licensed and unlicensed radio frequency bands simultaneously. The apparatus 400 can also provide for reselection and/or offloading between a cellular wireless network and a non-cellular wireless network. The apparatus 400 can further provide for time sharing of frequency channels (and/or frequency bandwidth) in an unlicensed radio frequency band between an LTE-U capable wireless communication device and other "non-cellular" wireless communication devices configured to share the same unlicensed radio frequency band. The apparatus 400 can additionally provide for frequency hopping among multiple frequency channels in accordance with information provided by network equipment of a cellular wireless network.

In some example embodiments, the apparatus 400 can include processing circuitry 410 that is configurable to perform actions in accordance with one or more example embodiments disclosed herein. In this regard, the processing circuitry 410 can be configured to perform and/or control performance of one or more functionalities of the apparatus 400 in accordance with various example embodiments, and thus can provide means for performing functionalities of the apparatus 400 in accordance with various example embodiments. The processing circuitry 410 can be configured to perform data processing, application execution and/or other processing and management services according to one or more example embodiments.

In some embodiments, the apparatus 400 or a portion(s) or component(s) thereof, such as the processing circuitry 410, can include one or more chipsets, which can each include one or more chips. The processing circuitry 410 and/or one or more further components of the apparatus 400 can therefore, in some instances, be configured to implement an embodiment on a chipset comprising one or more chips. In some example embodiments in which one or more components of the apparatus 400 are embodied as a chipset, the chipset can be capable of enabling a computing device(s) to operate as an LTE-U capable wireless communication device, operating using radio frequency channels in an unlicensed radio frequency band together with radio frequency channels in a licensed radio frequency band using carrier aggregation across the licensed and unlicensed radio frequency bands, when implemented on or otherwise operably coupled to the computing device(s). In some embodiments, the processing circuitry 410 can include a processor 402 and, in some embodiments, such as that illustrated in FIG. 4A, can further include memory 404. The processing circuitry 410 can be in communication with or otherwise control multiple wireless subsystems, including a cellular wireless subsystem 408, which can include a cellular baseband processor 414, and a WLAN wireless subsystem 412, which can include a WLAN baseband processor 416. The processing circuitry 410 can be also in communication with a dual wireless manager 406, which can provide rules and/or actions to manage connections using the cellular wireless subsystem 408 and the WLAN wireless sub system 412.

The processor 402 can be embodied in a variety of forms. For example, the processor 402 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 402 can comprise a plurality of processors. The plurality of processors can be in operative communication with each other and can be collectively configured to perform one or more functionalities of the apparatus 400 as described herein. In embodiments including a plurality of processors, the plurality of processors can be implemented on a single computing device, or can be distributed across a plurality of computing devices that can collectively provide functionality of an LTE-U capable wireless communication device. In some example embodiments, the processor 402 can be configured to execute instructions that can be stored in the memory 404 or that can be otherwise accessible to the processor 402. As such, whether configured by hardware or by a combination of hardware and software, the processor 402 can be capable of performing operations according to various embodiments while configured accordingly.

In some example embodiments, the memory 404 can include one or more memory devices. Memory 404 can include fixed and/or removable memory devices. In some embodiments, the memory 404 can provide a non-transitory computer-readable storage medium that can store computer program instructions that can be executed by the processor 402. In this regard, the memory 404 can be configured to store information, data, applications, instructions and/or the like for enabling the apparatus 400 to carry out various functions in accordance with one or more example embodiments. In embodiments including a plurality of memory devices, the plurality of memory devices can be implemented on a single computing device, or can be distributed across a plurality of computing devices that can collectively provide functionality of an LTE-U capable wireless communication device. In some embodiments, the memory 404 can be in communication with one or more of the processor 402, the dual wireless manager module 406, the cellular wireless subsystem 408, and/or the WLAN wireless subsystem 412 via one or more busses for passing information among components of the apparatus 400.

The apparatus 400 can further include multiple wireless subsystems, e.g., the cellular wireless subsystem 408 and the WLAN wireless subsystem 412. The wireless subsystems 408/412 can include one or more mechanisms for enabling communication with other wireless communication devices and/or wireless networks. For example, the WLAN wireless subsystem 412 can be configured to enable the apparatus 400 to communicate over a WLAN. The apparatus 400 can include multiple wireless subsystems, which can each provide communication in accordance with a wireless communication protocol. In some embodiments, the multiple wireless subsystems, e.g., cellular wireless subsystem 408 and WLAN wireless subsystem 412, of the apparatus 400 can communicate with each other directly via a communication path 418 or indirectly through communication with the processing circuitry 410.

The apparatus 400 can further include a dual wireless manager module 406. The dual wireless manager module 406 can be embodied as various means, such as circuitry, hardware, a computer program product comprising computer readable program instructions stored on a non-transitory computer readable medium (for example, the memory 404) and executed by a processing device (for example, the processor 402), or some combination thereof. In some embodiments, the processor 402 (or the processing circuitry 410) can include, or otherwise control the dual wireless manager module 406. The dual wireless manager module 406 can be configured to support wireless communication using multiple wireless communication protocols and/or using a wireless communication protocol that supports communication using multiple radio frequency bands, including but not limited to communication using a licensed radio frequency band channel and an unlicensed radio frequency band channel together via carrier aggregation. The dual wireless manager module 406 can also be configured to provide management of communication using the multiple wireless subsystems 408/412, e.g., to mitigate coexistence interference between them and/or with other wireless communication devices that share an unlicensed radio frequency band.

Figure 4B:
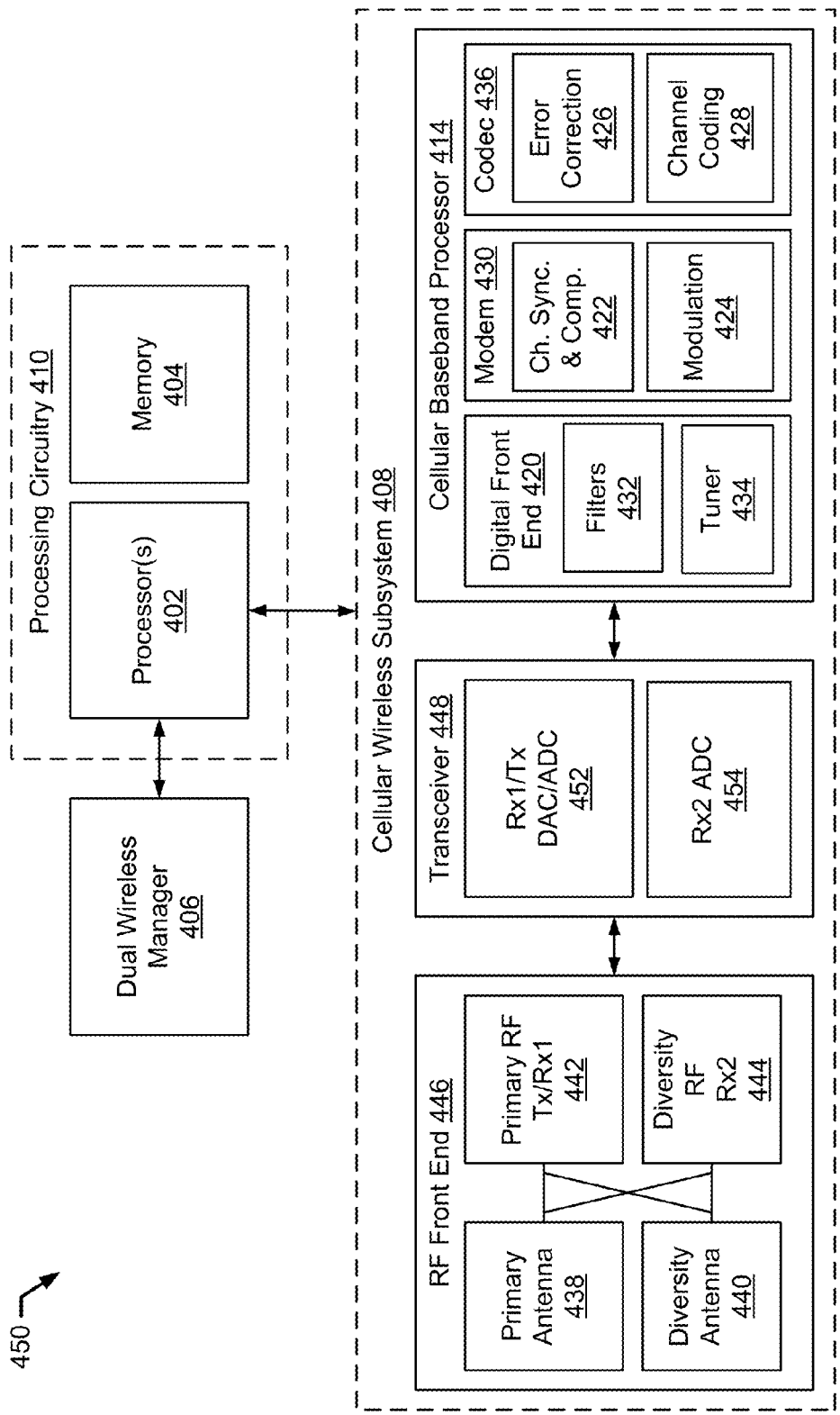

FIG. 4B illustrates a block diagram 450 of components of a wireless communication device (e.g., a UE 106, an LTE compliant UE 204/208, an LTE-A compliant UE 206, an LTE-U compliant UE 252) including processing circuitry 410 having one or more processor(s) 402 and a memory 404, and a cellular wireless subsystem 408 having an cellular baseband processor 414, one or more transceiver(s) 448 and a set of RF analog front end circuitry 446. The cellular wireless subsystem 408 can include an RF front end 436 that includes a set of one or more antennas, e.g., a primary antenna 438 and a diversity antenna 440, which can be interconnected with supporting RF circuitry, e.g., a primary RF Tx/Rx1 442 component block and a diversity RF Rx2 444 component block. The primary RF Tx/Rx1 442 component block can include filters and other analog components that can be "tuned" to match transmission and/or reception of analog signals via a corresponding antenna, e.g., primary antenna 438, diversity antenna 440, or both primary and diversity antennas 338/440. In some embodiments, the RF front end 436 can be controlled by signals (e.g., digital control signals) communicated from the cellular baseband processor 414 and/or the processing circuitry 402, either directly from the processor(s) 402/414 or indirectly via another component in the cellular wireless subsystem 408.

The processing circuitry 410 and/or the cellular baseband processor 414 can be configured to perform and/or control performance of one or more functionalities of the wireless communication device in accordance with various implementations. The processing circuitry 410 and/or processing circuitry in the cellular wireless subsystem 408 can provide functionality for operating the cellular wireless subsystem to communicate using multiple component carriers via carrier aggregation across both licensed and unlicensed radio frequency bands, e.g., by executing instructions in the processor 402 and/or in the cellular baseband processor 414, in accordance with one or more embodiments. In this regard, the processing circuitry 410 and/or the cellular baseband processor 414 can be configured to perform and/or control performance of one or more functionalities of the wireless communication device in accordance with various implementations, and thus can provide functionality operation in accordance with carrier aggregation using unlicensed and licensed radio frequency bands in parallel. The processing circuitry 410 may further be configured to perform data processing, application execution, and/or other device functions according to one or more embodiments of the disclosure.

The wireless communication device, or portions or components thereof, such as the processing circuitry 410 and the cellular baseband processor 414, can include one or more chipsets, which can respectively include any number of coupled microchips thereon. The processing circuitry 410, the cellular baseband processor 414, and/or one or more other components of the wireless communication device may also be configured to implement functions associated with various procedures to manage and/or operate using combinations of licensed and unlicensed radio frequency bands.

In some embodiments, the processor(s) 402/414 may be configured in a variety of different forms. For example, the processor(s) 402/414 may be associated with any number of microprocessors, co-processors, controllers, or various other computing or processing implements, including integrated circuits such as, for example, an application specific integrated circuit (ASIC), a field programmable gate array (FPGA), or any combination thereof. In various scenarios, multiple processors 402/414 of the wireless communication device can be coupled to and/or configured in operative communication with each other, and these components may be collectively configured to methods for the management and use of multiple radio frequency channels in carrier aggregation schemes that use both unlicensed and licensed radio frequency bands in parallel as described further herein.

It should be appreciated that not all of the components, device elements, and hardware illustrated in and described with respect to the wireless communication device 450 of FIG. 4B may be essential to this disclosure, and thus, some of these items may be omitted, consolidated, or otherwise modified within reason. Additionally, in some implementations, the subject matter associated with the wireless communication device can be configured to include additional or substitute components, device elements, or hardware, beyond those depicted within the illustrations of FIG. 4B.

Figure 5:
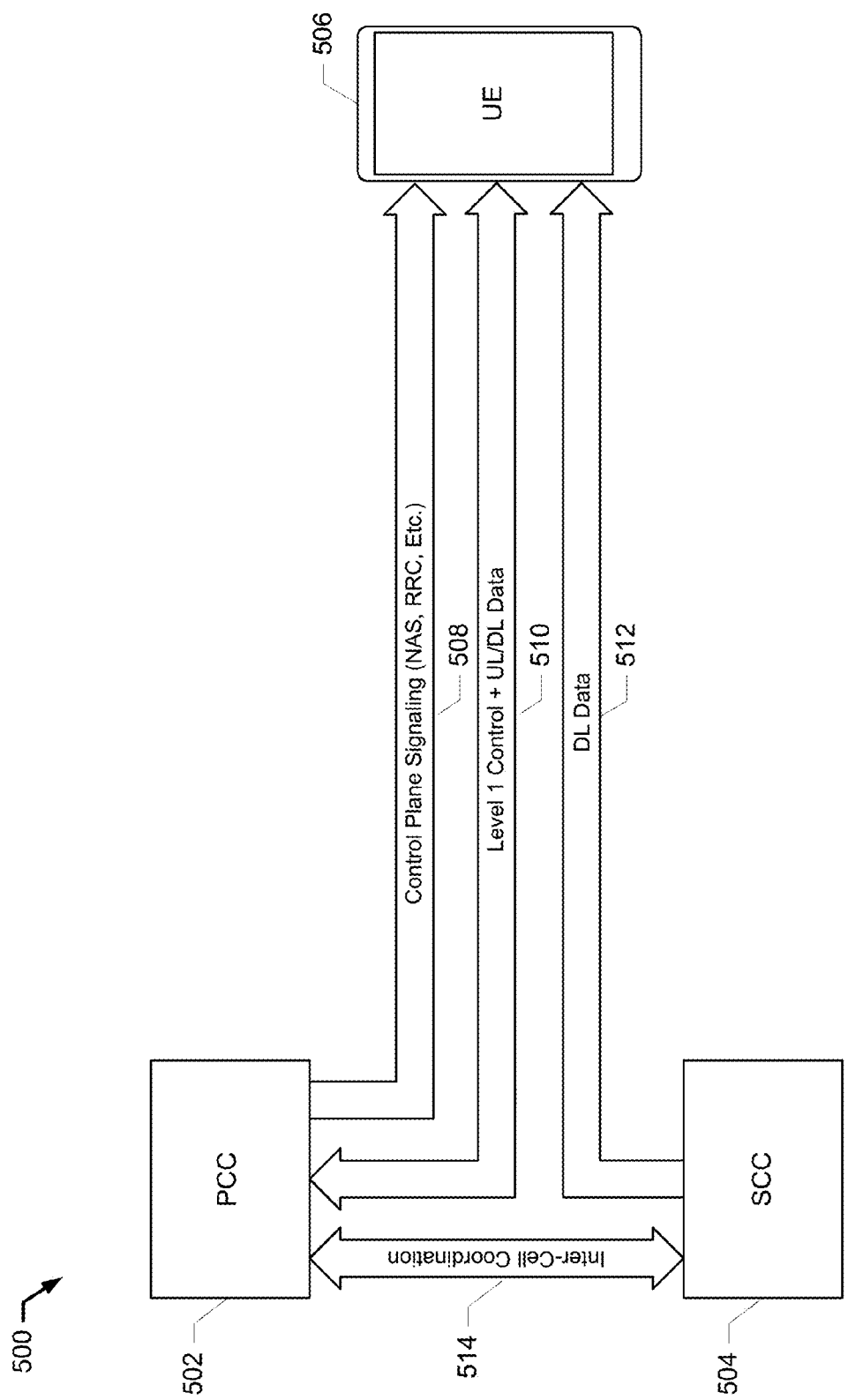
FIG. 5 illustrates a diagram of data and signaling communication between a wireless communication device and a set of network component carriers for carrier aggregation in an LTE network, in accordance with various embodiments of the disclosure.

FIG. 5 illustrates a block diagram 500 of control signaling and data communication using both a primary component carrier (PCC) 502, (which can include both downlink and uplink communication with a particular "primary" cell of a wireless network), and a secondary component carrier (SCC) 504, (which can provide downlink communication from another particular "secondary" cell of the wireless network). Control plane signaling, e.g., for non-access stratum (NAS) signaling and radio resource control (RRC) signaling, can be communicated between the wireless network via the primary component carrier to a wireless communication device, e.g., user equipment (UE) 506. The UE 506 can include an LTE and/or LTE-A compliant and/or LTE-U compliant wireless communication device as described elsewhere herein capable of communicating with one or more eNodeB (base stations) of a wireless network operating in accordance with LTE, LTE-A, and/or LTE-U wireless communication protocols. The UE 506 can be capable of communicating with the wireless network via both the PCC 502 and the SCC 504 simultaneously, e.g., using LTE-A carrier aggregation radio access technology (RAT) and/or using LTE-U carrier aggregation RAT (e.g., in both licensed and unlicensed radio frequency bands simultaneously). In some embodiments, downlink (DL) data is communicated from the wireless network to the UE 506 using both the PCC 502 and the SCC 504 simultaneously, i.e., employing a form of carrier aggregation as specified in various LTE/LTE-A wireless communication protocols, to provide an increased bandwidth and increased downlink data rate and/or throughput performance. In some embodiments, uplink (UL) data is communicated from the UE 506 to the wireless network using only the PCC 502 (and not the SCC 504) in accordance with one or more LTE/LTE-A wireless communication protocols. Thus, in some embodiments, the UE 506 can be configured to use carrier aggregation modes that use multiple parallel frequency carriers in shared, adjacent, or distinct frequency bands in the downlink direction and a single frequency carrier in the uplink direction. In some embodiments, all level 1 (L1) physical (PHY) layer control data communication 510 is communicated via the PCC 502, e.g., by a default configuration and/or in accordance with LTE/LTE-A wireless communication protocols. In some embodiments, coordination of the communication of packet data to and from the UE via the PCC 502 and the SCC 504 through two separate cells can be provided using an "inter-cell" communication link 514 between the cells. In some embodiments, control plane signaling can be used to activate and deactivate the use of secondary cells in unlicensed radio frequency bands. In some embodiments, control plane signaling can be used to provide information about secondary cells available for communication in unlicensed radio frequency bands, including for example rules for time sharing of frequency channels and/or frequency hopping among multiple frequency channels in the unlicensed radio frequency bands.

Figure 6:
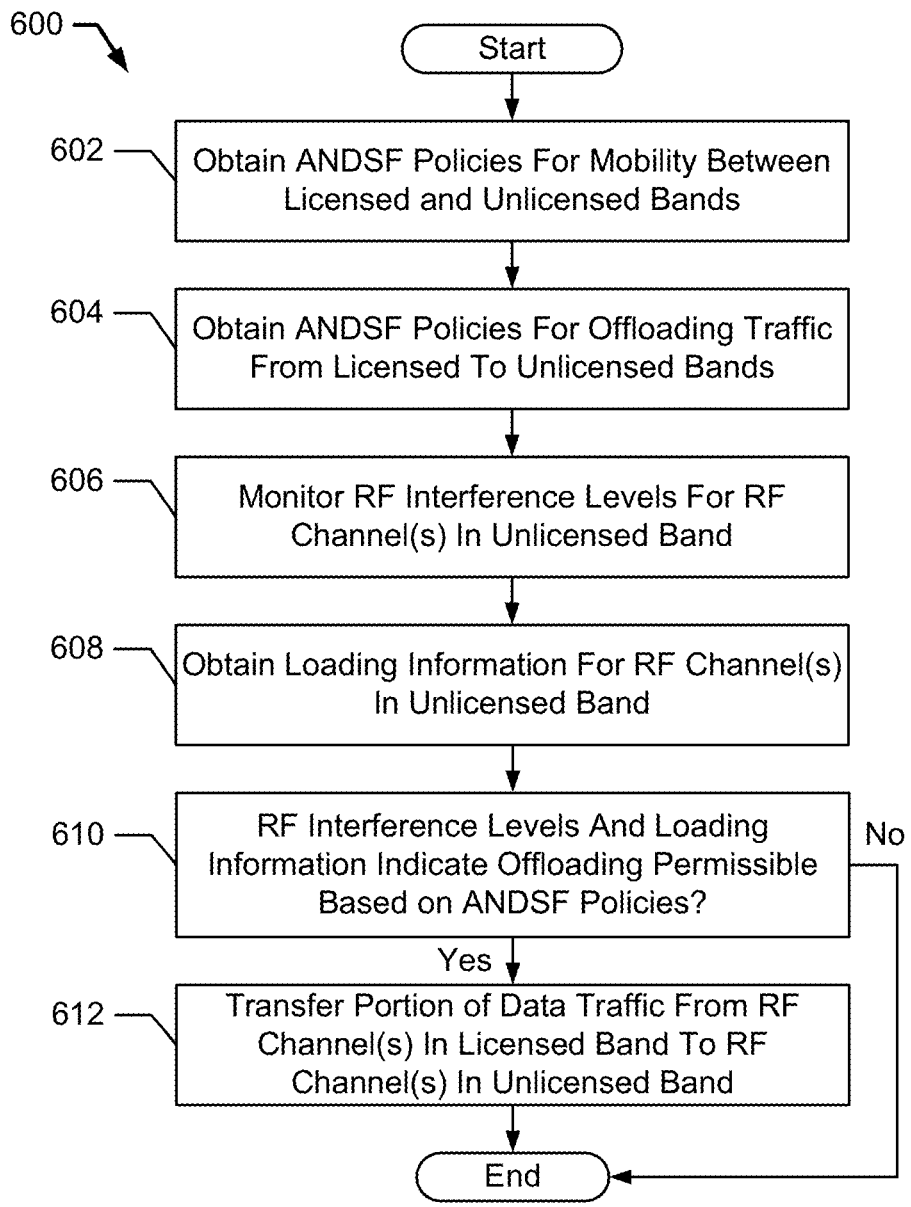
FIG. 6 illustrates a flowchart depicting a method for managing radio frequency communication using multiple radio frequency channels in licensed and/or unlicensed radio frequency bands, in accordance with various embodiments of the disclosure.

FIG. 6 illustrates a flowchart 600 depicting a method for managing radio frequency communication using multiple radio frequency channels in licensed and/or unlicensed radio frequency bands, in accordance with various embodiments of the disclosure. In a first step 602, an LTE-U capable wireless communication device obtains one or more ANDSF policies for mobility between radio frequency channels in licensed radio frequency bands and radio frequency channels in unlicensed radio frequency bands. In a subsequent step 604, the LTE-U capable wireless communication device obtains one or more ANDSF policies for offloading traffic from the radio frequency channels in the licensed radio frequency bands to the radio frequency channels in the unlicensed radio frequency bands. In some embodiments, the LTE-U capable wireless communication device obtains the ANDSF policies from access network equipment of a wireless network, e.g., from an eNodeB. In some embodiments, the ANDSF policies are provided during provisioning and/or during software updating of the LTE-U capable wireless communication device. In step 606, the LTE-U capable wireless communication device monitors radio frequency interference levels in one or more radio frequency channels of the unlicensed radio frequency bands. In some embodiments, the LTE-U capable wireless communication device uses a cellular wireless subsystem and/or a wireless local area network subsystem to monitor the radio frequency interference levels in the one or more radio frequency channels of the unlicensed radio frequency bands. In step 608, the LTE-U capable wireless communication device obtains loading information for one or more radio frequency channels in the unlicensed radio frequency bands. In step 610, the LTE-U capable wireless communication device determines whether the monitored radio frequency interference levels and the loading information indicate that at least one radio frequency channel in the unlicensed radio frequency band is available for offloading in accordance with the one or more ANDSF policies for offloading traffic. When the monitored radio frequency interference levels and the loading information indicate that at least one radio frequency channel in the unlicensed radio frequency band is available for offloading in accordance with the one or more ANDSF policies for offloading traffic, in step 612, the LTE-U capable wireless communication device transfers at least a portion of data communication traffic from a radio frequency channel in the licensed radio frequency band to the at least one radio frequency channel in the unlicensed radio frequency band. In some embodiments, the LTE-U capable wireless communication device determines availability of a radio frequency channel for offloading based on control messages communicated from the eNodeB of the wireless network, e.g., as part of one or more radio resource control (RRC) messages and/or as part of one or more system information broadcast (SIB) messages. In some embodiments, the LTE-U capable wireless communication device provides information about measured and/or estimated radio frequency interference levels for at least one RF channel in the unlicensed radio frequency band to the eNodeB of the wireless network. In some embodiments, the LTE-U wireless communication device determines whether one or more radio frequency channels in the unlicensed radio frequency band is available for offloading by comparing loading levels for the one or more radio frequency channels to a set of one or more loading threshold levels. In some embodiments, the LTE-U wireless communication device determines whether one or more radio frequency channels in the unlicensed radio frequency band is available for offloading by comparing measured levels of radio frequency interference to a set of one or more interference threshold levels. In some embodiments, the at least one RF channel in the unlicensed radio frequency band operate in accordance with an LTE/LTE-A/LTE-U wireless communication protocol and overlap with at least one RF channel in the unlicensed radio frequency band used for communication in accordance with a Wi-Fi wireless communication protocol. In some embodiments, the ANDSF policies are broadcast by the eNodeB of the wireless network using RRC signaling messages, e.g. one or more system information block (SIB) messages. In some embodiments, the ANDSF policies include lists of WLAN frequency channels available for managed WLAN communication in the unlicensed radio frequency band. In some embodiments, the ANDSF policies include lists of RF channels in the unlicensed radio frequency band available for LTE-U communication.

Figure 7:
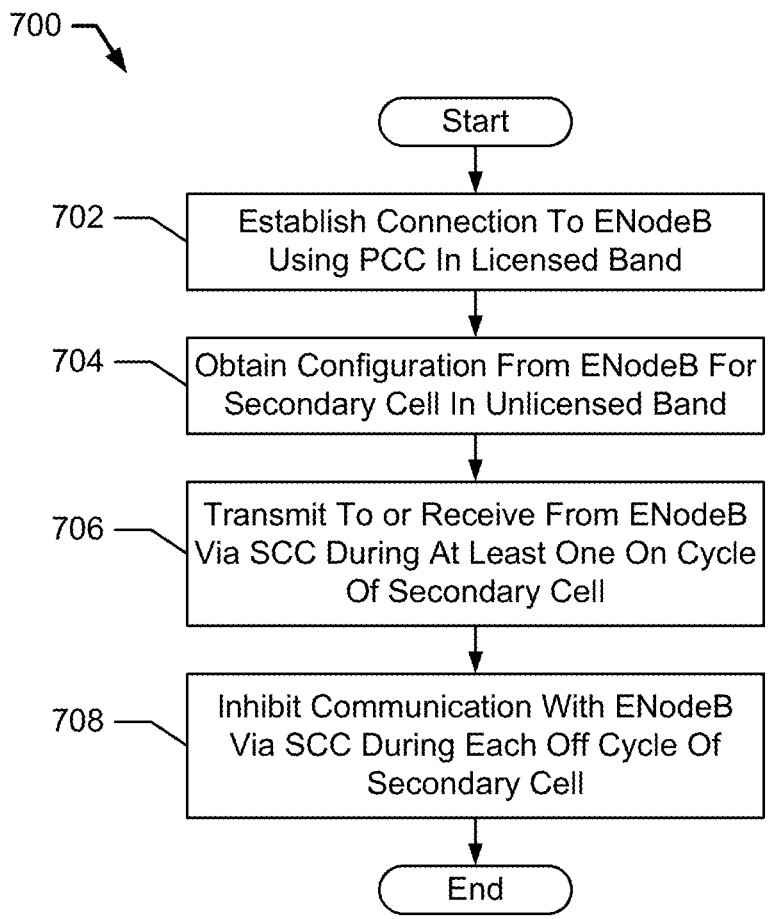
FIG. 7 illustrates a flowchart depicting a method for time division multiplexing coexistence for wireless communication devices, in accordance with some embodiments of the disclosure.

FIG. 7 illustrates a flowchart 700 depicting a method for time division multiplexing coexistence for wireless communication devices, in accordance with some embodiments of the disclosure. In step 702, an LTE-U capable wireless communication device establishes a connection with an eNodeB of a cellular wireless network using a primary component carrier (PCC) of a primary cell in a licensed radio frequency (RF) band. In some embodiments, the connection includes a radio resource control (RRC) signaling connection between the LTE-U capable wireless communication device and the eNodeB to provide for control of one or more component carriers used for carrier aggregation. In step 704, the LTE-U capable wireless communication device obtains a configuration for a secondary cell from the eNodeB. The secondary cell, in some embodiments, operates using one or more radio frequency channels in an unlicensed radio frequency band. In some embodiments, the configuration includes a set of timers that indicate an "on" cycle and an "off" cycle for time division based coexistence of transmission over the one or more radio frequency channels of the secondary cell and transmission over parallel radio frequency channels used by non-cellular wireless communication devices, e.g., wireless local area network devices operating in accordance with Wi-Fi wireless communication protocols. In some embodiments, the set of timers include information for starting times and ending times for the "on" and "off" cycles of the secondary cell. In some embodiments, the starting and ending times are specified using one or more system frame number (SFN) values. In some embodiments, the LTE-U capable wireless communication device maintains a start timer that provides an indication for a start for each "on" cycle and a stop timer that provides an indication for a start of each "off" cycle for communication via the secondary component carrier in the secondary cell. In some embodiments, all LTE-U capable wireless communication devices configured to use the secondary component carrier are synchronized to the same "on" and "off" cycles based on configuration information provided by the eNodeB. In step 706, the LTE-U capable wireless communication device transmits to the eNodeB or receives from the eNodeB communication via the secondary component carrier of the secondary cell during at least one "on" cycle. In step 708, the LTE-U capable wireless device inhibits (or refrains from) communication with the eNodeB via the secondary component carrier of the secondary cell during each "off" cycle. In some embodiments, each "off" cycle spans a time period that is sufficient for a WLAN device, e.g., operating in accordance with a Wi-Fi wireless communication protocol, to sense availability of a radio frequency channel in the unlicensed radio frequency band that overlaps at least in part with the secondary component carrier and to transmit at least one data packet via the radio frequency channel in the unlicensed radio frequency band. In some embodiments, the "off" cycle spans at least 20 milliseconds or at least 40 milliseconds. In some embodiments, configuration for the secondary cell is broadcast by the eNodeB to the LTE-U capable wireless communication device using one or more system information (SIB) messages. In some embodiments, the configuration for the secondary cell is communicated by the eNodeB to the LTE-U capable wireless communication device using one or more radio resource control (RRC) signaling messages. In some embodiments, "on" and "off" cycles for all secondary cells for an eNodeB use a common timing pattern. In some embodiments, each secondary cell for the eNodeB use different timing patterns for their respective "on" and "off" cycles. During "off" cycles, the LTE-U capable wireless device communicates with the eNodeB using radio frequency resources in the licensed radio frequency band and not in the unlicensed radio frequency band, e.g., using the primary component carrier of the primary cell.

Figure 8:
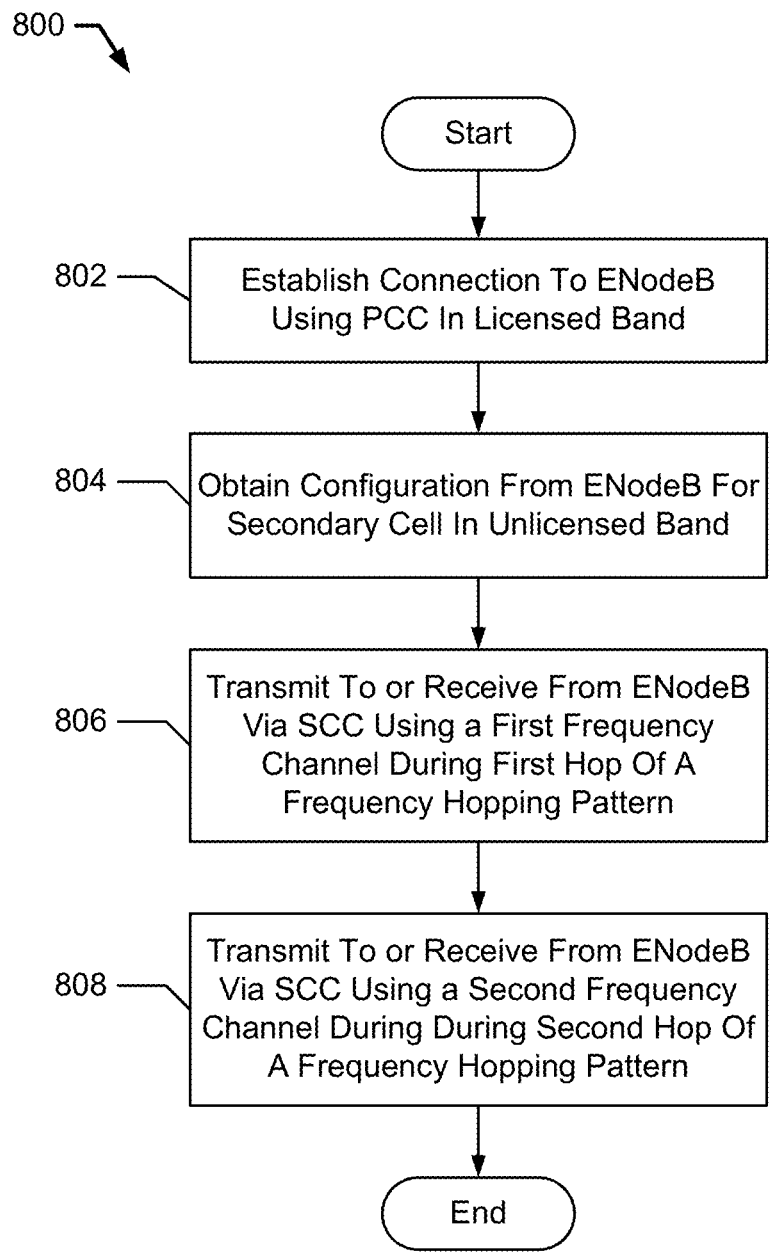
FIG. 8 illustrates a flowchart depicting a method for frequency hopping coexistence for wireless communication devices, in accordance with some embodiments of the disclosure.

FIG. 8 illustrates a flowchart 800 depicting a method for frequency hopping coexistence for wireless communication devices, in accordance with some embodiments of the disclosure. In a first step 802, an LTE-U capable wireless communication device establishes a connection with an eNodeB of a wireless network using a primary component carrier (PCC) in a licensed radio frequency band. In some embodiments, the connection includes a radio resource control (RRC) signaling connection between the LTE-U capable wireless communication device and the eNodeB to provide for control of one or more component carriers used for carrier aggregation. In step 804, the LTE-U capable wireless communication device obtains a configuration for a secondary cell from the eNodeB. The secondary cell, in some embodiments, operates using a set of radio frequency channels in an unlicensed radio frequency band. In some embodiments, the configuration includes a frequency hopping pattern for the set of frequency channels, or for a subset of the set of frequency channels, wherein the frequency hopping pattern specifies a sequence of frequency channels to use by the LTE-U capable wireless communication device during each successive hop of the frequency hopping pattern. Each frequency channel can be in an unlicensed radio frequency (RF) band, and the LTE-U capable wireless communication device can switch between different radio frequency channels based on the frequency hopping pattern specified by the eNodeB. In some embodiments, the frequency hopping pattern is communicated to the LTE-U capable wireless communication device in a broadcast system information block (SIB) message or in one or more RRC signaling messages. In some embodiments, the frequency hopping pattern changes over time, e.g., based on operating conditions of the secondary cell in which the frequency hopping pattern applies and/or based on loading conditions for frequency channels and/or based on measured radio frequency interference obtained by the eNodeB. In some embodiments, the LTE-U capable wireless communication device measures radio frequency interference in one or more RF channels of the unlicensed radio frequency band and provides information about the measured radio frequency interference to the eNodeB, which in turn determines a frequency hopping pattern (e.g., a set of RF channels, a sequence for the set of RF channels, times for using each RF channel in the set of RF channels, etc.) based at least in part on the information about radio frequency interference obtained. In step 806, the LTE-U capable wireless communication device transmits to or receives from the eNodeB via a secondary component carrier (SCC) during a first hop of the frequency hopping pattern, e.g., on a first frequency channel specified by the frequency hopping pattern and for a period of time that does not exceed a time period to use the first frequency channel specified by the frequency hopping pattern. In step 808, the LTE-U capable wireless communication device configures a cellular wireless subsystem to use a second frequency channel as specified by the frequency hopping pattern for a period of time also specified in the frequency hopping pattern. In some embodiments, the eNodeB provides the LTE-U capable wireless communication device a sequence of RF channels in the unlicensed radio frequency band and a time period to use each RF channel. In some embodiments, time periods, start times, and/or stop times are specified using SFN values. In some embodiments, the unlicensed radio frequency band is an ISM frequency band or a UNII frequency band. In some embodiments, the frequency hopping pattern is specified using a set of frequency channel numbers or by a set of center frequency values for the secondary component carrier.

The various aspects, embodiments, implementations or features of the described embodiments can be used separately or in any combination. Further, some aspects of the described embodiments may be implemented by software, hardware, or a combination of hardware and software. The described embodiments can also be embodied as computer program code stored on a non-transitory computer-readable medium. The computer readable-medium may be associated with any data storage device that can store data which can thereafter be read by a computer or a computer system. Examples of the computer-readable medium include read-only memory, random-access memory, CD-ROMs, Solid-State Disks (SSD or Flash), HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method for managing use of radio frequency channels in an unlicensed radio frequency band, the method comprising:

by a wireless communication device:
obtaining one or more access network discovery and selection function (ANDSF) policies for mobility to move connections of the wireless communication device between cellular network-managed cells that operate in a licensed radio frequency band and cellular network-managed wireless local area networks (WLANs) that operate in the unlicensed radio frequency band;
obtaining one or more ANDSF policies for offloading data communication traffic between radio frequency channels in the licensed radio frequency band and radio frequency channels in the unlicensed radio frequency band, which include both cellular network-managed WLAN radio frequency channels and cellular network-scheduled radio frequency channels for unlicensed Long Term Evolution (LTE-U) secondary cells;
monitoring radio frequency interference levels for one or more LTE-U radio frequency channels in the unlicensed radio frequency band;
obtaining loading information for the one or more LTE-U radio frequency channels in the unlicensed radio frequency band; and
when the monitored radio frequency interference levels and the loading information indicate that at least one of the one or more LTE-U radio frequency channels in the unlicensed radio frequency band is available for offloading in accordance with the one or more ANDSF policies for offloading data communication traffic, transferring at least a portion of data communication traffic from a radio frequency channel in the licensed radio frequency band to the at least one of the one or more LTE-U radio frequency channels in the unlicensed radio frequency band,
wherein the ANDSF policies include at least a first list of WLAN radio frequency channels for cellular network-managed WLAN communication in the unlicensed radio frequency band, a second list of LTE-U radio frequency channels for cellular network-scheduled communication in the unlicensed radio frequency band, and rules for offloading to LTE-U radio frequency channels based on LTE-U interference levels and LTE-U loading levels.

2. The method of claim 1 further comprising:
by the wireless communication device:
providing the radio frequency interference levels for the one or more LTE-U radio frequency channels in the unlicensed radio frequency band to an enhanced NodeB of a wireless network.

3. The method of claim 1, wherein the wireless communication device includes at least a cellular wireless subsystem configured to operate in accordance with a Long Term Evolution (LTE) or Long Term Evolution Advanced (LTE-A) wireless communication protocol.

4. The method of claim 3, wherein the wireless communication device includes at least a wireless local area network subsystem configured to operate in accordance with a Wi-Fi wireless communication protocol.

5. The method of claim 1, wherein the monitored radio frequency interference levels indicate that the at least one of the one or more LTE-U radio frequency channels in the unlicensed radio frequency band is available for offloading when a monitored level of radio frequency interference for the at least one of the one or more LTE-U radio frequency channels is below an interference threshold level specified in the ANDSF policies.

6. The method of claim 1, wherein the loading information indicates that the at least one of the one or more LTE-U radio frequency channels in the unlicensed radio frequency band is available for offloading when a loading level for the at least one of the one or more LTE-U radio frequency channels in the unlicensed radio frequency band is below a loading threshold level specified in the ANDSF policies.

7. The method of claim 1, wherein the ANDSF policies are communicated by an enhanced NodeB of a wireless network using radio resource control (RRC) signaling messages.

8. The method of claim 1, wherein the ANDSF policies are communicated by an enhanced NodeB of a wireless network using system information block (SIB) messages.

9. The method of claim 1, wherein:
the ANDSF policies for mobility include rules for reselection to cellular network-managed WLAN connections based on a combination of LTE-U interference levels and WLAN interference levels; and
a cellular wireless subsystem of the wireless communication device measures the LTE-U interference levels, while a WLAN wireless subsystem of the wireless communication device measures the WLAN interference levels.

10. A wireless communication device comprising:
a cellular wireless subsystem;
a wireless local area network (WLAN) wireless subsystem; and
processing circuitry communicatively coupled to the cellular and WLAN wireless subsystems, the processing circuitry configured to cause the wireless communication device to:

obtain one or more access network discovery and selection function (ANDSF) policies for offloading data communication traffic between radio frequency channels in a licensed radio frequency band and radio frequency channels in an unlicensed radio frequency band, which include both cellular network-managed wireless local area network (WLAN) radio frequency channels and cellular network-scheduled radio frequency channels for unlicensed Long Term Evolution (LTE-U) secondary cells;

monitor radio frequency interference levels for one or more LTE-U radio frequency channels in the unlicensed radio frequency band;

obtain loading information for the one or more LTE-U radio frequency channels in the unlicensed radio frequency band; and when the monitored radio frequency interference levels and the loading information indicate that at least one of the one or more LTE-U radio frequency channels in the unlicensed radio frequency band is available for offloading in accordance with the one or more ANDSF policies for offloading data communication traffic, transfer at least a portion of data communication traffic from a radio frequency channel in the licensed radio frequency band to the at least one of the one or more LTE-U radio frequency channels in the unlicensed radio frequency band, wherein the ANDSF policies include at least a first list of WLAN radio frequency channels for cellular network-managed WLAN communication in the unlicensed radio frequency band, a second list of LTE-U radio frequency channels for cellular network-scheduled communication in the unlicensed radio frequency band, and rules for offloading to LTE-U radio frequency channels based on LTE-U interference levels and LTE-U loading levels.

11. The wireless communication device of claim 10, wherein the processing circuitry is further configured to cause the wireless communication device to:

provide the radio frequency interference levels for the one or more LTE-U radio frequency channels in the unlicensed radio frequency band to an enhanced NodeB of a wireless network.

12. The wireless communication device of claim 10, wherein the cellular wireless subsystem operates in accordance with a Long Term Evolution (LTE) or Long Term Evolution Advanced (LTE-A) wireless communication protocol, and the WLAN wireless subsystem operates in accordance with a Wi-Fi wireless communication protocol.

13. The wireless communication device of claim 10, wherein the monitored radio frequency interference levels indicate that the at least one of the one or more LTE-U radio frequency channels in the unlicensed radio frequency band is available for offloading when a monitored level of radio frequency interference is below an interference for the at least one of the one or more LTE-U radio frequency channels threshold level specified in the ANDSF policies.

14. The wireless communication device of claim 10, wherein the loading information indicates that the at least one of the one or more LTE-U radio frequency channels in the unlicensed radio frequency band is available for offloading when a loading level for the at least one of the one or more LTE-U radio frequency channels in the unlicensed radio frequency band is below a loading threshold level specified in the ANDSF policies.

15. The wireless communication device of claim 10, wherein the ANDSF policies for offloading traffic are communicated by an enhanced NodeB of a wireless network using one or more of: Radio Resource Control (RRC) signaling messages and System Information Block (SIB) messages.

16. The wireless communication device of claim 10, wherein the processing circuitry is further configured to cause the wireless communication device to:

obtain one or more ANDSF policies for mobility to move connections of the wireless communication device between cellular network-managed cells that operate in the licensed radio frequency band and cellular network-managed wireless local area networks (WLANs) that operate in the unlicensed radio frequency band.

17. The wireless communication device of claim 16, wherein the processing circuitry is further configured to cause the wireless communication device to:

obtain additional information from an enhanced NodeB about radio frequency interference levels for one or more of radio frequency channels specified in the first and second lists of radio frequency channels.

18. The wireless communication device of claim 10, wherein:

the ANDSF policies for mobility include rules for reselection to cellular network-managed WLAN connections based on a combination of LTE-U interference levels and WLAN interference levels; and the cellular wireless subsystem of the wireless communication device measures the LTE-U interference levels, while the WLAN wireless subsystem of the wireless communication device measures the WLAN interference levels.

19. A non-transitory computer-readable medium storing executable instructions that, when executed by one or more processors of a wireless communication device, cause the wireless communication device to:

obtain one or more access network discovery and selection function (ANDSF) policies for offloading data communication traffic between radio frequency channels in a licensed radio frequency band and radio frequency channels in an unlicensed radio frequency band, which include both cellular network-managed wireless local area network (WLAN) radio frequency channels and cellular network-scheduled radio frequency channels for unlicensed Long Term Evolution (LTE-U) secondary cells;

monitor radio frequency interference levels for one or more LTE-U radio frequency channels in the unlicensed radio frequency band;

obtain loading information for the one or more LTE-U radio frequency channels in the unlicensed radio frequency band; and when the monitored radio frequency interference levels and the loading information indicate that at least one of the one or more LTE-U radio frequency channels in the unlicensed radio frequency band is available for offloading in accordance with the one or more ANDSF policies for offloading data communication traffic, transfer at least a portion of data communication traffic from a radio frequency channel in the licensed radio frequency band to the at least one of the one or more LTE-U radio frequency channels in the unlicensed radio frequency band, wherein the ANDSF policies include at least a first list of WLAN radio frequency channels for cellular network-managed WLAN communication in the unlicensed radio frequency band, a second list of LTE-U radio frequency channels for cellular network-scheduled communication in the unlicensed radio frequency band, and rules for offloading to LTE-U radio frequency channels based on LTE-U interference levels and LTE-U loading levels.

20. The non-transitory computer-readable medium of claim 19, wherein:
the ANDSF policies for mobility include rules for reselection to cellular network-managed WLAN connections based on a combination of LTE-U interference levels and WLAN interference levels; and
a cellular wireless subsystem of the wireless communication device measures the LTE-U interference levels, while a WLAN wireless subsystem of the wireless communication device measures the WLAN interference levels.

* * * * *